United States Patent
Vieira et al.

(10) Patent No.: US 12,527,333 B2
(45) Date of Patent: Jan. 20, 2026

(54) FOODSTUFF PRODUCTS, INGREDIENTS, PROCESSES AND USES

(71) Applicant: SOCIETE DES PRODUITS NESTLE S.A., Vevey (CH)

(72) Inventors: Joselio Batista Vieira, York (GB); Beatrice Kuschel, York (GB); Daniel Festring, York (GB)

(73) Assignee: Societe des Produits Nestle S.A., Vevey (CH)

( * ) Notice: Subject to any disclaimer, the term of this patent is extended or adjusted under 35 U.S.C. 154(b) by 310 days.

(21) Appl. No.: 16/499,524

(22) PCT Filed: Dec. 13, 2018

(86) PCT No.: PCT/EP2018/084848
§ 371 (c)(1),
(2) Date: Sep. 30, 2019

(87) PCT Pub. No.: WO2019/115735
PCT Pub. Date: Jun. 20, 2019

(65) Prior Publication Data
US 2020/0037630 A1   Feb. 6, 2020

(30) Foreign Application Priority Data

Dec. 14, 2017 (EP) ..................................... 17207266
Feb. 2, 2018 (EP) ..................................... 18154926
(Continued)

(51) Int. Cl.
*A23G 1/00* (2025.01)
*A23G 1/02* (2006.01)
(Continued)

(52) U.S. Cl.
CPC ................. *A23G 1/02* (2013.01); *A23G 1/40* (2013.01); *A23G 1/48* (2013.01); *A23V 2002/00* (2013.01)

(58) Field of Classification Search
CPC ... A23G 1/02; A23G 1/48; A23G 1/40; A23G 1/32; A23V 2002/00
See application file for complete search history.

(56) References Cited

U.S. PATENT DOCUMENTS

| 4,206,245 A | 6/1980 | Drevici et al. |
| 4,289,790 A | 9/1981 | Bruelle |

(Continued)

FOREIGN PATENT DOCUMENTS

| BR | 10 2013 005053-9 | 11/2014 |
| BR | 122020024473-9 | 6/2021 |

(Continued)

OTHER PUBLICATIONS

DeClerq F et al, Process for Extracting Sugars from Cocoa Pulp, Research Disclosure, Database #582084, Oct. 2012 (Year: 2012).*

(Continued)

*Primary Examiner* — Emily M Le
(74) *Attorney, Agent, or Firm* — K&L Gates LLP

(57) ABSTRACT

The present invention provides the use of a composition obtainable from pulp from a plant in the *Theobroma* genus, preferably cocoa pulp, or an extract of pulp from a plant in the *Theobroma* genus, preferably cocoa pulp, as an ingredient in a foodstuff, preferably a confectionery product.

21 Claims, 3 Drawing Sheets

US 12,527,333 B2
Page 2

(30) Foreign Application Priority Data

| Apr. 6, 2018 | (EP) | 18166122 |
| Jun. 15, 2018 | (EP) | 18178071 |

(51) Int. Cl.
*A23G 1/40* (2006.01)
*A23G 1/48* (2006.01)

(56) References Cited

U.S. PATENT DOCUMENTS

| 5,342,632 A * | 8/1994 | Bangerter | A23G 1/02 |
| | | | 426/45 |
| 2011/0070332 A1 | 3/2011 | Bernaert et al. | |
| 2013/0316056 A1 | 11/2013 | Parducci et al. | |
| 2016/0066593 A1 * | 3/2016 | Nielsen | A23G 1/0036 |
| | | | 426/631 |

FOREIGN PATENT DOCUMENTS

| CN | 102687838 A | 9/2012 | |
| EP | 3114939 | 1/2017 | |
| EP | 3114939 A1 * | 1/2017 | A23G 1/002 |
| EP | 3114942 | 1/2017 | |
| RU | 2269268 C2 | 2/2006 | |
| WO | 2006032701 A1 | 3/2006 | |
| WO | 2013177714 A1 | 12/2013 | |
| WO | 2017044610 | 3/2017 | |

OTHER PUBLICATIONS

Macedo M et al, Influence of pectinolyttic and cellulotyc enzyme complexes on cashew bagasse maceration in order to obtain carotenoids, J Food Sci Technol, 56(6), Jun. 2015, 3689-3693 (Year: 2014).*
(2005) Protection of Foods by Drying. In: Modern Food Microbiology. Food Science Text Series. Springer, Boston, MA. p. 443-456, https://doi.org/10.1007/0-387-23413-6_18 (Year: 2005).*
Nakamura A, et al., "Analysis of Structural Components and Molecular Construction of Soybean Soluble Polysaccharides by Stepwise Enzymatic Degradation," Bioscience, Biotechnology, and Biochemistry, May 22, 2014; 65:10, 2249-2258 (Year: 2014).*
Seo et al., "Improvement of Starch Extraction Efficiency from Potato with Cellulase Family", Food Engineering Progress, vol. 20, Issue No. 1, 2016, pp. 78-83.
Sowbhagya et al., "Enzyme-Assisted Extraction of Flavorings and Colorants from Plant Materials", Critical Reviews in Food Science and Nutrition, vol. 50, 2010, pp. 146-161.
Macedo et al., "Influence of Pectinolyttic and Cellulotyc Enzyme Complexes on Cashew Bagasse Maceration in Order to Obtain Carotenoids", Journal of Food Science and Technology, vol. 52, Issue No. 6, 2014, pp. 3689-3693.
"National Centre for Biotechnology Education—Pectinase (Pectinex)", University of Reading, 2018, pp. 1-3.
Third Party Observation for European Patent Appl No. 19155155.5 dated Aug. 17, 2020.
Cocoa Pulp Juice, 3 pages.
Superfood Ingredients Offers a Range of Nutritious, Organic and Raw Cacao Products Including Powder, Nibs, Beans, Butter as Well as Products From the Cacao Pulp Such as Puree, Freeze Dried Pulp Powder and Spray Dried Pulp Powder, 3 pages.
Cacao Extract & Powder, 2 pages.
Organic Chocolate With Cacao Pulp, Mashpi Chocolate Artesanal, 2 pages.
Nascimento Da Silva et al. "Nutritional value and antioxidant capacity of "cocoa honey" (*Theobroma cacao* L.)" Food Science and technology, 2014, vol. 34, No. 4, pp. 755-759.
Balladares et al. "Physicochemical characterization of *Theobroma cacao* L. sweatings in Ecuadorian coast" Emir. J. Food Agric. 2016, vol. 28, issue 10, pp. 741-745.
Russian Office Action for Appl No. 2019135308 dated Mar. 23, 2022.
Nascimento Da Silva Elias et al, Nutritional value and antioxidant capacity of "cocoa honey" (*Theobroma caco* L.) Food Sci. Technol, Campinas, 34(4): 755-759, Oct.-Dec. 2014.
Chinese Office Action for Chinese Appl No. 201880035281.0 dated Dec. 15, 2022.
Beckett, "The Science of Chocolate", Chapter 2, Glucose and Fructose, 2008, p. 28.
Brazil Third Party Observations for Appl No. BR 11 2019 016085 0 dated Jul. 10, 2024, 19 pages.
Stortz et al., "Heat Resistant Chocolate", Trends in Food Science & Technology, vol. 22, Issue No. 5, 2011, pp. 1-14.
European Office Action for Appl No. 19155155.5-1105 dated Nov. 15, 2024, 3 pages.
Puupponen-Pimia et al., "Enzyme-Assisted Processing Increases Antimicrobial and Antioxidant Activity of Bilberry", Journal of Agricultural and Food Chemistry, vol. 56, Issue No. 3, Feb. 1, 2008, pp. 681-688, XP055131401.
European Office Action for Appl No. 18 814 983.5-1105 dated Apr. 15, 2024, 8 pages.
Canada Office Action for Appl No. 3,056,038 dated Aug. 5, 2024, 5 pages.
Sacred Chocolate Oragnic Heart of Cocao, 2019, 3 pages.
Cocoa Pulp Juice, 3 pages, Nov. 2012.
Gardener et al., "Cacao Pulp: its Not Just a Waste Product of Cocoa Anymore", Jun. 5, 2013, Nutritional Outlook, 2 pages.
Madre Chocolate's Triple Cacao: Chewy, Chocolaty and Completely Unique, Jan. 5, 2015, 1 page.
Superfood Ingredients Offers a Range of Nutritious, Organic and Raw Cacao Products Including Powder, Nibs, Beans, Butter as Well as Products From the Cacao Pulp Such as Puree, Freeze Dried Pulp Powder and Spray Dried Pulp Powder, 3 pages, Mar. 2015.
Cacao Extract & Powder, 2 pages. May 2018.
Organic Chocolate With Cacao Pulp, Mashpi Chocolate Artesanal, 2 pages. Feb. 2017.
Meersman et al., "Characterization and Degradation of Pectic Polysaccharides in Cocoa Pulp", Journal of Agricultural and Food Chemistry, 2017, pp. 9726-9734.
Declercq et al., "Process for Extracting Sugars from Cocoa Pulp", Research Disclosure database No. 582084, ,2012 , 8 pages.

* cited by examiner

FOODSTUFF PRODUCTS, INGREDIENTS, PROCESSES AND USES

CROSS REFERENCE TO RELATED APPLICATIONS

The present application is a National Stage of International Application No. PCT/EP2018/084848, filed on Dec. 13, 2018, which claims priority to European Patent Application No. 17207266.2, filed on Dec. 14, 2017, European Patent Application No. 18154926.2, filed on Feb. 2, 2018, European Patent Application No. 18166122.4, filed on Apr. 6, 2018, and European Patent Application No. 18178071.9, filed on Jun. 15, 2018, the entire contents of which are being incorporated herein by reference.

The present invention relates to the field of new foodstuffs, preferably chocolate products, new ingredients for use in said products and uses of the new ingredients.

BACKGROUND

Whilst it is well known that the cocoa plant is harvested to produce cocoa seeds that are used to provide cocoa liquor, cocoa butter and cocoa powder, other portions of the cocoa pod are not utilised.

The cocoa pod consists of a husk, pulp and cocoa beans. The pulp is an aromatic, moist body that surrounds the pods.

In initial processing of the cocoa seed, the pulp is typically removed by fermentation and is hydrolysed by microorganisms. Hydrolysed pulp is known in the industry as "sweatings." During fermentation, the pulp provides the substrate for various microorganisms, which are essential to the development of chocolate flavour precursors, which are fully expressed later, during the roasting process. Although pulp is necessary for fermentation, often more pulp occurs than is needed.

Excess pulp has been used to produce cocoa jelly, alcohol and vinegar, nata, and processed pulp. By controlled fermentation and distillation, sweatings can be made into an alcoholic spirit containing over 40% ethanol. The alcohol produced can be further fermented to produce acetic acid.

Cocoa sweatings have been shown to be a suitable substrate for fermentation to produce nata, a product normally obtained from fermentation of coconut water.

Additionally, raw cacao pulp has been used to produce smoothies and other so-called "health" drinks.

However, there is no known use of the cocoa pulp or an extract thereof in non-added sugar confectionery, particularly chocolate products, and the present invention provides a novel product with advantageous properties.

SUMMARY OF INVENTION

The present invention relates to foodstuffs that comprise a composition obtainable from the pulp or an extract of the pulp from the plant genus *Theobroma*. The present invention also provides new compositions obtainable from the pulp from the plant genus *Theobroma*.

The present invention preferably provides a, preferably non-added sugar, confectionery product that comprises a composition obtainable from cocoa pulp or an extract of cocoa pulp.

The present invention provides the use of said composition obtainable from cocoa pulp or an extract of cocoa pulp as a sugar substitute, preferably in food and beverage compositions, preferably for use in confectionary products, more preferably for use in chocolate products.

The present invention provides advantageous properties in respect of a reduction, or entire removal, of added sugar, with the sweetness being provided from a natural source, that preferably also contains other components of the cocoa pod that contribute to the flavour of the chocolate.

Accordingly, the present invention provides an alternative for added sugars by providing naturally occurring sugars that are present in the source of cocoa mass, cocoa butter and/or cocoa powder.

Additionally, the present invention provides the use of a by-product of the chocolate manufacturing process that is typically discarded. Hence, the present invention provides advantages in respect of sustainability.

Hence, the present invention provides a composition that is obtained by a process comprising:
 a. treating cocoa pulp or an extract of cocoa pulp to reduce the polysaccharide content and/or treating cocoa pulp or an extract of cocoa pulp to adjust the pH,
 b. drying the product of step a).

The present invention also provides a process for producing a composition derived from cocoa pulp or an extract of cocoa pulp that comprises:
 a. treating cocoa pulp or an extract of cocoa pulp to reduce the polysaccharide content and/or treating cocoa pulp or an extract of cocoa pulp to adjust the pH,
 b. drying the product of step a).

The present invention also provides a process for producing a foodstuff, preferably a confectionery foodstuff, comprising the steps of:
 a. treating pulp from a plant in the *Theobroma* genus, preferably cocoa pulp, or an extract of pulp from a plant in the *Theobroma* genus, preferably cocoa pulp, to reduce the polysaccharide content and/or treating pulp from a plant in the *Theobroma* genus, preferably cocoa pulp, or an extract of pulp from a plant in the *Theobroma* genus, preferably cocoa pulp to adjust the pH,
 b. drying the product of step a., and
 c. combining the product of step b. with at least one other ingredient present in the foodstuff, preferably the confectionery foodstuff.

DETAILED DESCRIPTION

Pulp

Figure 1:
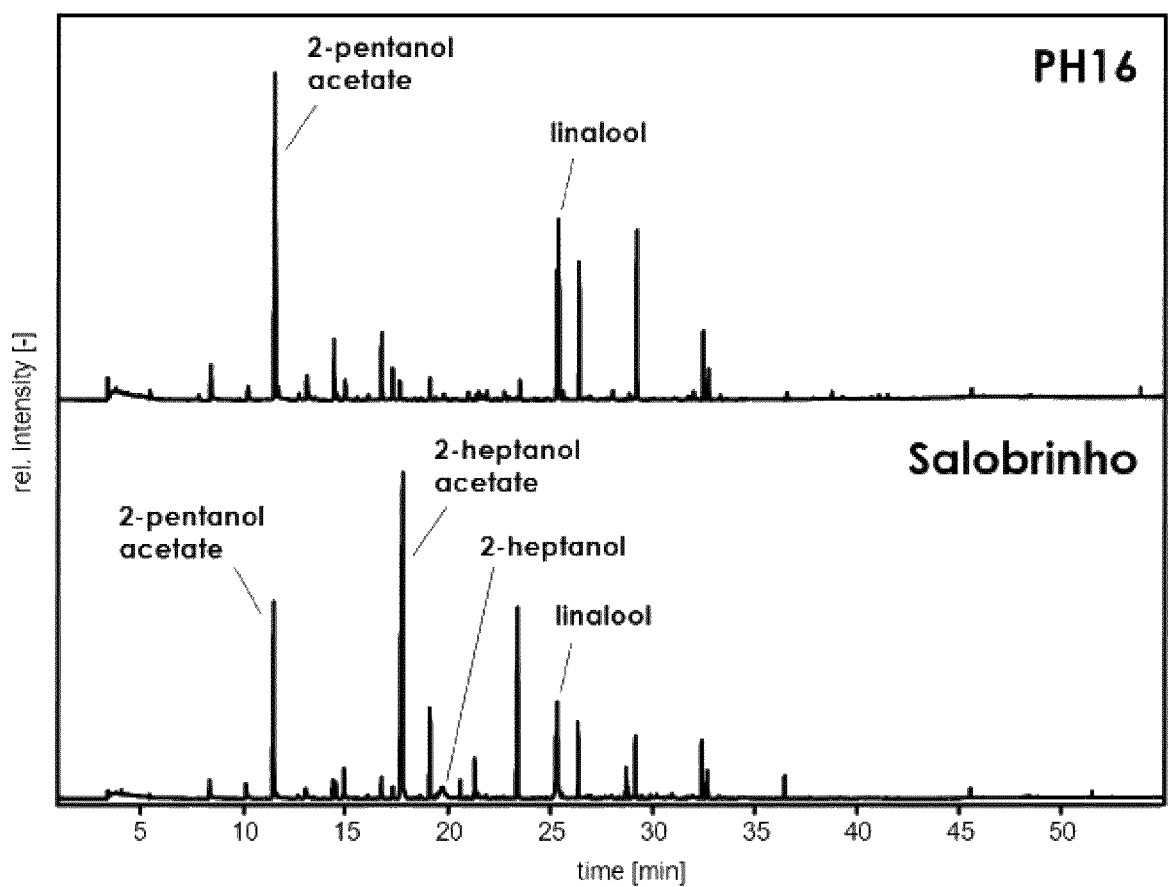
FIGS. 1 to 3 display GC-MS data for Examples 8 to 10

The pulp for use in the present invention is obtained from a plant or plants from the genus *Theobroma*, The plant genus comprises *Theobroma angustifolium, Theobroma bicolor* (mocambo), *Theobroma cacao, Theobroma canumanense, Theobroma grandiflorum* (cupuagu), *Theobroma mammosum, Theobroma microcarpum, Theobroma obovatum, Theobroma simiarum, Theobroma speciosum, Theobroma stipulatum Theobroma subincanum*, and *Theobroma sylvestre*. Preferably, the pulp is selected from cacao, cupuaca and mocambo and mixtures thereof, preferably cacao.

The embodiments described below are mentioned in respect of the preferred embodiment cocoa, but are equally applicable to pulp from all other plants in the genus *Theobroma*.

In the present invention, the term "pulp" relates to the mucilage-like coating around each bean. In the present invention, the term "cocoa pulp" also encompasses dried cocoa pulp, for example, in the form of a powder. However, where the term "dried cocoa pulp", for example, is used the cocoa pulp is limited to dried cocoa pulp. The origin of the cocoa pulp is not particularly limited and all known varieties of cocoa pod may provide the pulp. However, it is preferred that the sugar content of the cocoa pulp is as high as possible.

In the present invention, the term "extract" has the normal dictionary meaning, i.e. a portion of cocoa pulp comprising one or more components of cocoa pulp wherein one or more components of the original cocoa pulp have been removed to provide the extract. In the present invention, any water present in the cocoa pulp is not taken as being the extract, i.e. the cocoa pulp extract is not water. In an embodiment of the present invention, the cocoa pulp extract is in the form of a powder, i.e. the cocoa pulp extract has been dried to remove water.

It is a preferred embodiment of the present invention that the composition obtained from the cocoa pulp or cocoa pulp extract are dried. The remaining moisture contents are defined below.

In the embodiments described below, the cocoa pulp extracts are defined and the components described are of course present in the original cocoa pulp, i.e. are not added.

In an embodiment, the cocoa pulp extract may be a composition that is obtained by a process comprising:
 a. treating cocoa pulp or an extract of cocoa pulp (this extract is different from the extract prepared by this process) to reduce the polysaccharide content and/or treating cocoa pulp or an extract of cocoa pulp to adjust the pH,
 b. drying the product of step a).

In a preferred embodiment of the present invention, cocoa pulp is treated by the above defined process to provide a composition that is a cocoa pulp extract. Accordingly, in the present application below the term "cocoa pulp extract" is used to encompass but is not limited to the composition obtained from the process of the invention, i.e. the composition of the invention may preferably be considered as cocoa pulp extract.

In an embodiment, the pulp of the present invention is not fermented.

In a preferred embodiment, the pulp of the present invention is treated in steps a. and/or b. in the absence of any beans from the plants of the *Theobroma* genus. In a preferred embodiment, the treated pulp is not mixed with beans, preferably whole beans, from the plants of the *Theobroma* genus. In a preferred embodiment, the treated pulp is not mixed with beans, preferably whole beans, from the plants of the *Theobroma* genus. In a preferred embodiment, the treated pulp is not mixed with nibs from the plants of the *Theobroma* genus.

In a preferred embodiment, the cocoa pulp of the present invention is treated in steps a. and/or b. in the absence of whole cocoa beans and/or cocoa nibs.

In an embodiment of the present invention, provided is an extract of cocoa pulp that comprises sugar.

In an embodiment, the sugar comprises monosaccharides (e.g. fructose, fucose, galactose, glucose and/or rhamnose), disaccharides (e.g. lactose, maltose and/or sucrose) and/or oligosaccharides (e.g. less than 20, less than 10 or less than 8 saccharide units) and it is here defined as "cocoa sugar". Preferred sugars present in the cocoa pulp or cocoa pulp extract include sucrose, glucose or fructose and mixtures thereof.

In an embodiment, the cocoa pulp extract sugar comprises sugars selected from the group consisting of glucose, sucrose and fructose and combinations thereof, and it is here defined as "cocoa sugar". The cocoa sugar may vary in content and nature based on the variety of the cocoa pod.

In an embodiment of the present invention, the cocoa pulp extract or dried cocoa pulp comprises between 20.0% and 100% by weight of cocoa sugar based on the total weight of the extract or pulp, more preferably between 30.0% and 99.75%, more preferably between 30.0% and 99.50%, more preferably between 30.0% and 99.25%, and more preferably between 40.0% and 95.0%.

In embodiments of the present invention, for example, the cocoa pulp extract or dried cocoa pulp contains between 50.0% and 95.0% by weight of cocoa sugar based on the total weight of the extract or pulp, more preferably between 60.0% and 95.0%, more preferably between 65.0% and 90.0%, more preferably between 65.0% and 85.0%, more preferably between 65.0% and 80.0%.

In an embodiment, the cocoa sugar in the cocoa pulp extract or dried cocoa pulp comprises a significant amount of sucrose, preferably a majority of sucrose. In an embodiment, the sucrose content of the sugar component is greater than 35.0% by weight based on the weight of the sugar component (i.e. the total sugar content), more preferably greater than 40.0%, more preferably greater than 45.0%, more preferably greater than 50.0% more preferably greater than 55.0%, and more preferably greater than 60.0%.

In an embodiment, the cocoa sugar component comprises less than 90.0% by weight of the sugar component of sucrose, preferably less than 85.0%, more preferably less than 80.0%, more preferably less than 75.0%.

In the above embodiments, the cocoa sugar comprises glucose, fructose or a mixture of glucose and fructose, preferably the sum of glucose, fructose and sucrose equates to greater than 95.0% by weight of the cocoa sugar component, more preferably greater than 97.5%, more preferably greater than 98.5%, more preferably greater than 99.0% and more preferably 100%.

In an alternative embodiment, the cocoa sugar in the cocoa pulp extract or dried cocoa pulp comprises a significant amount of glucose and fructose, preferably a majority of glucose and fructose. In an embodiment, the glucose and fructose content of the sugar component is greater than 45.0% by weight based on the weight of the sugar component, more preferably greater than 50.0%, and more preferably greater than 55.0%. For example, greater than 65.0%, greater than 75.0%, greater than 80.0%, or greater than 85.0%.

In an embodiment, the cocoa sugar component consists of 100%, or comprises less than 99.0% by weight of glucose and fructose, preferably less than 95.0%. For example, less than 92.0%, less than 90.0%, less than 87.0%, less than 85.0%, or less than 75.0%.

In an embodiment, the cocoa sugar component comprises between 45.0% and 100% of a combination of glucose and fructose based on the weight of the sugar component, preferably between 55.0% and 100% and preferably between 60.0% and 100% or between 80.0% and 99.0%.

In an embodiment, the fructose content of the sugar component is greater than 15.0% by weight based on the weight of the sugar component (i.e. the total sugar content), more preferably greater than 20.0%, more preferably greater than 25.0%, more preferably greater than 30.0% more greater than 35.0%, and greater than 40.0%.

In an embodiment, the cocoa sugar component comprises less than 75.0% by weight of the sugar component of fructose, preferably less than 70.0%, more preferably less than 65.0%, more preferably less than 60.0%.

In an embodiment, the cocoa sugar component comprises between 20.0% and 75.0% by weight of fructose, preferably between 30.0% and 60.0%.

In an embodiment, the glucose content of the sugar component is greater than 15.0% by weight based on the weight of the sugar component (i.e. the total sugar content), more preferably greater than 20.0%, more preferably greater than 25.0%, more preferably greater than 30.0% more greater than 35.0%, and greater than 40.0%.

In an embodiment, the cocoa sugar component comprises less than 75.0% by weight of the sugar component of glucose, preferably less than 70.0%, more preferably less than 65.0%, more preferably less than 60.0%.

In an embodiment, the cocoa sugar component comprises between 20.0% and 75.0% by weight of glucose, preferably between 30.0% and 60.0%.

In the above embodiments, the remainder of the cocoa sugar comprises sucrose, preferably the remainder of the sugar comprises sucrose, lactose, maltose, galactose or combinations thereof.

In a preferred embodiment, the sugar component of the cocoa pulp or cocoa pulp extract comprises between 0.10% and 50.0% or between 5.0% and 50.0% by weight of sucrose and the sugar component constitutes between 20.0% and 100% by weight of the cocoa pulp or cocoa pulp extract, preferably the cocoa pulp or cocoa pulp extract is dried.

In a preferred embodiment, the sugar component of the cocoa pulp or cocoa pulp extract comprises between 45.0% and 100.0% or between 45.0% and 99.0% by weight of fructose and glucose and the sugar component constitutes between 20.0% and 100% by weight of the cocoa pulp or cocoa pulp extract, preferably the cocoa pulp or cocoa pulp extract is dried.

In a preferred embodiment, the above sugar contents are obtained using HPAEC-PAD (High-Performance Anion-Exchange Chromatography with Pulsed Amperometric Detection). A preferred analysis method is defined in the examples section.

In an embodiment of the present invention, the cocoa pulp extract comprises further components selected from the list comprising of fibres, hydrocolloids, proteins, acids, polyphenols, phenolic-polymers, polysaccharides, methylxanthines and anti-oxidants (other than those encompassed by the other components listed). In a preferred embodiment, these are intrinsic components of the cocoa pulp and are not added separately.

In an embodiment of the present invention, the cocoa pulp extract comprises components selected from the list consisting of phenolic acids, catechin, epicatechin, and proanthocyanidins.

In an embodiment of the present invention, the cocoa pulp extract comprises pectin. In an embodiment, as discussed below, the cocoa pulp is treated to remove, preferably partially or essentially all, pectin and optionally to, preferably partially, remove other polysaccharides.

In an embodiment of the present invention, the cocoa pulp extract comprises lignin.

In an embodiment of the present invention, the cocoa pulp extract comprises cellulose or hemicellulose and a combination thereof. In an embodiment, as discussed below, the cocoa pulp is treated to remove, preferably partially or essentially all, cellulose or hemicellulose and a combination thereof and optionally to, preferably partially, remove other polysaccharides.

In an embodiment of the present invention, the cocoa pulp extract comprises components selected from the list consisting of caffeine, theobromine, and theophylline.

In an embodiment of the present invention, the cocoa pulp extract comprises an acid selected from the group consisting of citric acid, malic acid, tartaric acid and ascorbic acid and combinations thereof.

In an embodiment of the present invention, the fibre comprises dietary fibre.

In an embodiment of the present invention, the cocoa pulp extract comprises a fibre component and an acid component, wherein the amount of fibre component is lower than the sugar component by 30% weight or more of the pulp extract.

In an embodiment, the confectionery products of the present invention comprise additional components derived from the cocoa pod, for example, the products comprise cocoa powder or cocoa husk fibre (soluble and insoluble dietary fibre). In an embodiment, the additional components are provided as a carrier for the cocoa pulp or cocoa pulp extract. In an embodiment, the additional components are combined with the cocoa pulp or cocoa pulp extract prior to the preparation of the compositions of the invention.

In an embodiment of the present invention, the cocoa pulp extract, a dried cocoa pulp extract or the dried cocoa pulp comprises less than 10.0% by weight of water, preferably less than 8.0%, more preferably less than 5.0%, more preferably less than 2.0%, and more preferably less than 1.0%. In an embodiment, it noted that entire dehydration is potentially not achievable, thus, the water content is optionally greater than 0.1%, greater than 0.5% or greater than 1.0%.

In an embodiment of the present invention, the cocoa pulp extract is prepared by a process that comprises removing the cocoa pulp from the cocoa pod, thermally treating, optionally concentrating, and drying the cocoa pulp.

In an embodiment, the cocoa pulp is removed from the cocoa pod, for example, by the process of EP0442421 (Nestle SA). An alternative means of removing the cocoa pulp from the cocoa pods in an embodiment of the present invention is the use of a commercially available pulper, preferably fitted with brushes.

In the above embodiment, the thermal treatment step relates to treatment at high temperatures (typically 120° C. to 160° C.) for a very short period (typically no more than 200 seconds and optionally typically more than 50 seconds) to deactivate any microbial contaminants to make the ingredient safe for human consumption. Alternatively, different temperatures may be used, for example, 80° C. to 100° C., and different times, for example 10 to 25 seconds. The thermal treatment step is not particularly limited, as long as pasteurisation occurs without product degradation.

In an embodiment, the drying is preferably carried out using spray drying, vacuum drying, drum drying, oven-drying, foam drying, tray drying, fluid bed drying, crystallization drying (preferably using a seed crystal of sugar) or freeze-drying (lyophilization).

In an embodiment, the drying takes place at greater than 45° C., preferably greater than 50° C. preferably greater than 55° C. and greater than 60° C. In an embodiment, the drying takes place at less than 125° C., preferably less than 100° C., preferably less than 90° C. and preferably less than 85° C. or less than 80° C. In a preferred embodiment, the drying takes place between 45° C. and 100° C. and more preferably between 45° C. and 85° C.

In an embodiment, the drying takes place for greater than 1 hour, preferably greater than 5 hours, preferably greater than 10 hours, greater than 15 hours or greater than 20 hours. In an embodiment, the drying takes place for less than 72 hours, preferably less than 60 hours, preferably less than 50 hours or less than 40 hours.

In a preferred embodiment, the drying takes place between 45° C. and 125° C. and between 1 hour and 72 hours. Preferably, the above ranges relates to oven-drying, optionally with- or without-vacuum.

In an embodiment, the drying step occurs as soon as possible after the cocoa pulp has been isolated from other components on the cocoa pod.

In a preferred embodiment, the cocoa pulp and/or cocoa pulp extract is in the form of a powder, preferably a dried powder. In an embodiment, the powder has a particle size, d50 (preferably diameter where 50% of the mass of the particles in the sample have a diameter below that value), preferably in the range of 20 to 1000 microns, preferably 200 to 800 microns or 20 to 150 microns. For example, 100 to 1000 microns, 25 to 100 microns or 35 to 200 microns. Preferably, laser diffraction is used to measure the particle size, d50 using a Malvern Mastersizer 2000, Method Scirocco 2000 dry attachment, Fraunhofer scattering theory.

Alternatively, the particle size is measured by mesh, e.g. has a particle size less than 18 mesh (1000 microns), less than 20 mesh (841 microns), less than 40 mesh (420 microns), less than 100 mesh (149 microns) and less than 140 mesh (105 microns) and preferably greater than 625 mesh (20 microns), greater than 550 mesh (25 microns), 140 mesh (105 microns) or greater than 70 mesh (210 microns).

The powder may be obtained from the dried cocoa pulp or dried cocoa pulp extract using standard refining methods, e.g. milling, ball milling, jet milling, 2-, 3- or 5-roll refiners. In an embodiment, the powder may undergo further refining in the production process for a foodstuff, e.g. during the conching process for preparing chocolate.

Whilst it is preferable to process the cocoa pulp when fresh, in an embodiment, once depulped the cocoa pulp may be frozen to ensure freshness prior to subsequent treatment. This freezing may be carried out by standard equipment for freezing vegetable and fruit matter known in the art. If freezing is used at any point in the process of the present invention, the cocoa pulp or cocoa pulp extract is preferably subsequently defrosted prior to incorporation into the product of the invention.

In an embodiment, the cocoa pulp or cocoa pulp extract is treated to reduce the polysaccharide content to obtain a composition of the present invention.

The term polysaccharide relates to the dictionary definition of such polymers, i.e. a carbohydrate that consists of a number of molecules bonded together, preferably polysaccharides have greater than 8 saccharide units, greater than 10 units, or greater than 20 units and optionally less than 1000 units or less than 750 units.

The term encompasses both hetero- and homo-polysaccharides, linear and non-linear, for example.

In a preferred embodiment, the reduction in polysaccharide content means a degradation of the original polysaccharides, e.g. degradation of pectin, cellulose etc., into smaller polysaccharides, oligomers, and/or di/mono-saccharides. This degradation leads to a change in the molecular weight distribution of the polysaccharides, i.e. the molecular weight of the polysaccharides is lowered owing to the cleaving of the larger polysaccharides into smaller compounds.

Without being bound by theory, the reduction in polysaccharide content, preferably pectin and/or cellulose, leads to a reduction in any gelling and/or "jamming" effects caused when eating the products of the present invention.

In an embodiment, the cocoa pulp or cocoa pulp extract is treated to modify the viscosity, preferably to lower the viscosity.

In an embodiment, the viscosity is reduced by greater than 20%, preferably greater than 40%, more preferably greater than 60%, more preferably greater than 80% and more preferably greater than 90%. In an embodiment, the viscosity is reduced by less than 98%, less than 95%, less than 75% or less than 70%. In an embodiment of the invention the viscosity is reduced by between 20% and 98%, i.e. the viscosity of the treated sample is between 20% and 98% of that of the untreated sample. A method of measuring of the viscosity is given in the examples. As this is a relative value, the method used is not particularly important.

However, preferably, the viscosity is dynamic viscosity measured in centipoises. A preferred specific method for measuring viscosity is present in the examples using a Rapid Viscosity Analyzer.

The treatment with an enzyme may lead to improved mouthfeel in foodstuff products, preferably chocolate products, containing the composition of the present invention.

In an embodiment, the cocoa pulp or cocoa pulp extract is hydrolysed to reduce the polysaccharide content.

In an embodiment, the treatment of the cocoa pulp or cocoa pulp extract may increase the mono- and/or di- and/or oligo-saccharide content.

In an embodiment, the cocoa pulp extract production process comprises the treatment of the cocoa pulp or cocoa pulp extract with an enzyme. In an embodiment, the treatment with an enzyme lowers the viscosity of the cocoa pulp or cocoa pulp extract. This aspect of the invention provides advantages in respect of processing of the composition into products, preferably confectionery products, and/or removes any potential unwanted organoleptic properties from using an overly viscous raw material.

In an embodiment, the treatment to reduce the polysaccharide content and/or to modify the viscosity may be done mechanically or physically, for example by centrifugation, preferably in a decanting centrifuge. This treatment may be used to remove polysaccharides present in the pulp.

In an embodiment, the temperature for enzyme treatment is between 20° C. and 75° C., for example between 30° C. and 65° C., between 55° C. and 75° C. or between 30° C. and 55° C.

In an embodiment, the amount of enzyme used is between 10 mg/L and 250 mg/L of the cocoa pulp or cocoa pulp extract, preferably between 25 mg/L and 200 mg/L, preferably between 50 mg/L and 150 mg/L.

In an embodiment, the amount of enzyme used is between 1.0 g/L and 200 g/L of the cocoa pulp or cocoa pulp extract, preferably between 2.0 g/L and 100 g/L, preferably between 5.0 g/L and 50 g/L.

In an embodiment, the amount of enzyme used is between 0.05 ml/kg and 200 ml/kg of the cocoa pulp or cocoa pulp extract, between 0.1 ml/kg and 200 ml/kg, between 1.0 ml/kg and 200 ml/kg, preferably between 2.0 ml/kg and 100 ml/kg, preferably between 5.0 ml/kg and 50 ml/kg and more preferably 5.0 ml/kg and 20 ml/kg or 0.1 ml/kg and 10 ml/kg.

In an embodiment, the amount of enzyme used is between 0.10% and 20% of the weight of the cocoa pulp or cocoa pulp extract, preferably between 0.20% and 10%, more preferably between 0.5% and 5.0%.

The above-amounts relate to all enzymes present, i.e. the total amount of enzyme used relative to the cocoa pulp or cocoa pulp extract.

In an embodiment, the above ratios are based on a solids content of the cocoa pulp or cocoa pulp extract of between 10% and 75%, preferably for cocoa pulp of between 10% and 20% total solids content.

In an embodiment, the treatment process with an enzyme is carried out for between 10 minutes and 20 hours, between 10 minutes and 10 hours, 10 minutes and 8 hours, between 10 minutes and 6 hours, between 15 minutes and 4 hours, between 15 minutes and 2 hours or between 30 minutes and 2 hours.

In an embodiment, the treated cocoa pulp or cocoa pulp extract is stored and the suspended particles settle, preferably this is at a temperature between 2.0° C. and 10.0° C. and preferably for a time period of between 12 hours and 72 hours (for example, at between 3.0° C. and 5.0° C. for between 24 hours and 60 hours). In an embodiment, the treated cocoa pulp or cocoa pulp extract is subsequently filtered using known filtration techniques in the field of fruit pulp processing to provide a purified product.

In an embodiment, the cocoa pulp or cocoa pulp extract is treated to remove or degrade pectin and/or cellulose, preferably by treatment with an enzyme.

In an embodiment, the cocoa pulp or cocoa pulp extract is treated with a pectinase, for example EC 4.2.2.10 (CAS 9033-35-6), EC 3.2.1.15 (CAS 9032-75-1), EC 3.1.1.11 (CAS 9025-98-3), EC 4.2.2.9 or EC 4.2.2.2 (CAS 9015-75-2) and mixtures thereof.

In a further embodiment, enzymes other than pectinase may be used, or mixtures of enzymes may be used. In an embodiment, the enzymes used may be selected from the group comprising lignin-modifying enzymes and carbohydrases (for example, arabanase/arabinanase, cellulase, beta-glucanase, hemicellulase and xylanase) and mixtures thereof.

In an embodiment, the cocoa pulp or cocoa pulp extract is treated with a cellulase, for example EC 3.2.1.4, EC 3.2.1.91 or EC 3.2.1.21, or EC 3.2.1.99 and mixtures thereof.

Pectinases are classified in respect of: 1) pectin, pectic acid or oligo-D-galacturonate is the substrate; 2) is the cleavage random (endo-, liquefying or depolymerising enzymes) or endwise (exo- or saccharifying enzymes) and 3) whether they act by hydrolysis or trans elimination. In a preferred embodiment, the enzyme used is selected from the group consisting of pectin esterases, polymethylgalacturonases (exo- or endo), polygalacturonases (exo- or endo), polymethylgalacturonate lyases (exo- or endo), polygalacturonate lyases (exo- or endo) and protopectinases (e.g. endo-1.5-alpha-L-arabinanase) and mixtures thereof.

In an embodiment, an enzyme is added to the cocoa pulp or cocoa pulp extract either prior to or subsequent to any drying step and/or concentration step. In an embodiment, the addition of the enzyme is subsequent to a process step where any innate enzymes in the cocoa pulp have been inactivated.

In an embodiment, the enzyme selection and reaction conditions may be optimised for the substrate to be treated. For example, it is well known that certain pectinases operate at their optimum at acidic pH and others at an alkaline pH (for example, see Table 2, Pectinases: Enzymes for fruit processing industry, International Food Research Journal 21(2): 447-453 (2014), which is incorporated by reference).

In an embodiment, the amount of pectinase used is between 10 mg/L and 250 mg/L of the cocoa pulp or cocoa pulp extract, preferably between 25 mg/L and 200 mg/L, preferably between 50 mg/L and 150 mg/L.

In an embodiment, the amount of pectinase used is between 1.0 g/L and 200 g/L of the cocoa pulp or cocoa pulp extract, preferably between 2.0 g/L and 100 g/L, preferably between 5.0 g/L and 50 g/L.

In an embodiment, the amount of pectinase used is between 0.05 ml/kg and 200 ml/kg of the cocoa pulp or cocoa pulp extract, between 0.1 ml/kg and 200 ml/kg, between 1.0 ml/kg and 200 ml/kg, preferably between 2.0 ml/kg and 100 ml/kg, preferably between 5.0 ml/kg and 50 ml/kg and more preferably between 5.0 ml/kg and 20 ml/kg or 0.1 ml/kg and 10 ml/kg.

In an embodiment, the amount of pectinase used is between 0.10% and 20% of the weight of the cocoa pulp or cocoa pulp extract, preferably between 0.20% and 10%, more preferably between 0.5% and 5.0%.

The above-amounts relate to all pectinases present, i.e. if a mixture of enzymes is used, the total amount of pectinase used relative to the cocoa pulp or cocoa pulp extract.

In an embodiment, the pectinase has an activity of between 0.50 U and 1.50 U per gram of pulp, for example between 0.75 U and 1.25 U per gram of pulp.

Where appropriate, the enzymes may have an activity of between 1000 PGNU/ml and 30000 PGNU/ml, between 2000 PGNU/ml and 10000 PGNU/ml, for example between 3000 PGNU/ml and 8500 PGNU/ml.

Where appropriate, the enzymes may have an activity of between 50 PTF and 500 PTF, for example between 60 PTF and 400 PTF.

Where appropriate, the enzymes may have a polygalacturonase activity of between 2000 and 20000 micromol/min/g, for example between 3000 and 12000 micromol/min/g.

The activities of the various pectinases that may be used in the present invention are defined by the recited known standards. Polygalacturonase unit (PGNU) is defined as the amount of enzyme which will produce 1 mg of galacturonic acid sodium salt under standard conditions (acetate buffer, pH 4.5, 40° C., 10 minute reaction time, 540 nm) and is given per ml of substrate or the amount of enzyme required to release one micromol of galacturonic acid from polygalacturonic acid per minute in acetate buffer, pH 4.5, 40° C. and is given per ml or g of enzyme (preferably the latter method is used). Correspondingly, pectinesterase unit (PEU) activity is that amount of enzyme which consumes 1 micro equivalent of sodium hydroxide per minute under standard conditions (30° C., pH 4.5). Pectin lyase unit (PLU) is the quantity of enzyme that catalyses the split of bound endo alpha-1-4 galacturonosidyl (C6 Methyl ester) forming one micromole of delta-4,5 unsaturated product in one minute, according to the above conditions but at 45° C. and pH 5.5. PTF unit activity corresponds an enzyme activity, which leads to an increase of the extraction of 0.01 after 1 minute, at pH 5.8 and 30° C. at 235 nm in a 0.5% pectin solution.

In an embodiment of the invention, the enzyme used in a treatment process of the present invention is selected from the group consisting of Ultrazym® AFP-L (for example, from Novo Nordisk Ferment Ltd), Rohament® PL, Rohapect® TPL or PTF (AB Enzymes), Novozyme® 33095, Pectinex® Ultra AFP, UF, Ultra Colour or Ultra Clear (Novozymes NS), Neopectinase PL1® (Novozymes NS), pectin lyase 1A (nzytech), Depol 793 (Biocatalyst), Rapidase® Fibre (DSM) and mixtures thereof, for example.

In an embodiment, the cocoa pulp or cocoa pulp extract may be treated with other enzymes than pectinases or a mixture of a pectinase with another enzyme. The other enzymes may have activity against other polysaccharides (for example on glucans, cellulose, hemicellulose, arabinans, and/or beta-1,4-xylan) present in the cocoa pulp.

In an embodiment, the amount of cellulase used is between 0.05 ml/kg and 200 ml/kg of the cocoa pulp or cocoa pulp extract, between 0.10 ml/kg and 150 ml/kg, preferably between 0.1.0 ml/kg and 100 ml/kg, preferably between 5.0 ml/kg and 50 ml/kg and more preferably between 5.0 ml/kg and 20 ml/kg or between 0.1 ml/kg to 10 ml/kg.

In an embodiment, the amount of enzyme used is between 0.10% and 20% of the weight of the cocoa pulp or cocoa pulp extract, preferably between 0.20% and 10%, more preferably between 0.5% and 5.0%.

The above-amounts relate to all cellulases present, i.e. if a mixture of enzymes is used, the total amount of cellulase used relative to the cocoa pulp or cocoa pulp extract.

In an embodiment, the above ratios are based on a solids content of the cocoa pulp or cocoa pulp extract of between 10% and 75%, preferably for cocoa pulp of between 10% and 20% total solids content.

The activity of the various cellulases that may be used in the present invention are defined by the recited known standards. One cellulase unit (U) is defined as the amount of enzyme that causes the release of 1.25 micromole of glucose equivalents per minute at pH 4.6 and 40° C. One cellulolytic unit (ACU) is determined based upon the reduction of viscosity of a guar gum solution. In a preferred embodiment, the activity is between 400 and 3000 micromol/min/g, for example between 500 and 2500 micromol/min/g.

In an embodiment of the invention, the enzyme used in a treatment process of the present invention is selected from the group consisting of Cellulase 13L (Biocatalysts), Cellulase CE-3, Cellulase FG conc. (Enzyme Development Corporation), Cellulosin GMY and mixtures thereof, for example.

In an embodiment, the enzyme treatment may be carried out using at least two carbohydrases, optionally at least three carbohydrases, optionally at least four carbohydrases and optionally less than 20 carbohydrases or less than 10 carbohydrases.

In an embodiment, a mixture of enzymes is used with an activity of greater than 60 FBGU, optionally greater than 75 FBGU. Optionally, the activity is less than 180 FBGU, optionally less than 150 FBGU, and optionally less than 125 FBGU. For example, between 60 FBGU and 180 FBGU. One Fungal Beta-Glucanase Unit (FBGU) is the enzyme quantity which hydrolyzes fungal beta-glucan to reducing sugars corresponding to 1 μmol glucose per minute at pH 5.0 at 30° C.

In an embodiment, the cocoa pulp or cocoa pulp extract is treated with the mixture of enzymes between 1 hour and 7 hours, preferably between 2 hours and 5 hours.

In an embodiment, the cocoa pulp or cocoa pulp extract is treated with Viscozyme L (Novozymes NS), which is a multi-enzyme complex containing a wide range of carbohydrases including arabanase, cellulase, beta-glucanase, hemicellulase, and xylanase.

In an embodiment, the enzymes used in the treatment may be deactivated, preferably prior to any drying of the cocoa pulp and/or cocoa pulp extract. Any suitable process may be used for this deactivation, for example, treatment at 80-110° C. for a time period of preferably between 2 minutes and 10 minutes, for example 5 minutes.

In an embodiment, the cocoa pulp or cocoa pulp extract is treated to increase the pH, for example the cocoa pulp is treated with an alkaline salt or base. The nature of the compound is not particularly limited, but is preferably a food-grade compound. In a preferred embodiment, the cocoa pulp is treated with compound such as mono-/di-/tri-sodium-/potassium-/calcium-phosphates, mono-/di-ammonium phosphate, sodium hydroxide, calcium hydroxide, potassium hydroxide, sodium carbonate, calcium carbonate, or potassium carbonate and mixtures thereof in order to increase the pH.

In an embodiment, the alkaline salt or base is combined with the cocoa pulp or cocoa pulp extract at an amount of greater than 0.10 wt % of the cocoa pulp or cocoa pulp extract, preferably greater than 0.15 wt % and preferably greater than 0.20 wt %. In an embodiment, the alkaline salt or base is combined with the cocoa pulp or cocoa pulp extract at an amount of less than 1.25 wt % of the cocoa pulp or cocoa pulp extract, preferably less than 1.0 wt % and preferably less than 0.90 wt %, for example between 0.10 wt % and 1.25 wt %, between 0.20 wt % and 0.90 wt % or between 0.25 wt % and 0.85 wt %.

In an embodiment, as mentioned above, the pH of the cocoa pulp is increased to be higher than the range of 2.75-4.0, optionally greater than 3.3-4.0 or 3.0-3.7 (all measured at 20° C.), for example, the pH is increased to be greater than 4.5, greater than 5.0, greater than 5.5 or greater than 6.0. For example, the pH is increased but is not increased to be greater than 8.0, not greater than 7.5 or not greater than 7.0 or not greater than 6.5.

In a preferred embodiment, the agent to increase the pH is added as an aqueous solution or slurry to the pulp. In a preferred embodiment, the concentration of the agent in water is between 5 g/100 ml and 50 g/100 ml, preferably between 10 g/100 ml and 30 g/100 ml. Preferably by adding the agent as an aqueous solution or slurry, undesired gelling does not occur which may increase viscosity of the pulp.

In an embodiment, the enzymatic treatment is carried out after the treatment to increase the pH. In an alternative embodiment, the enzymatic treatment is carried out before the pH treatment.

In an embodiment, the enzymatic treatment is carried out when the pH of the pulp is between 3.3 and 6.0, preferably between 4.25 and 5.0.

In an alternative embodiment, the pH treatment is carried out using dialysis (ion exchange). For example, using the processes disclosed in EP0049497 (Nestle SA).

In an embodiment, the process comprises treatment of the cocoa pulp in order to maximise the sugar content of the extract. In an embodiment, this treatment is to increase the amount of monomeric saccharides at the expense of dimeric, trimeric, oligomeric and/or polymeric saccharides or increase the trimeric and/or oligomeric content at the expense of polymeric saccharides. In an embodiment, this treatment may be enzymatic.

An embodiment of the present invention comprises the following steps: depulping of cocoa pods, pasteurisation of the pulp (e.g. thermal treatment), optionally enzymatic treatment and/or optionally alkalinisation treatment and drying (preferably by freeze-drying, vacuum drying or spray-drying). In a preferred embodiment, provided is a process comprising: depulping of cocoa pods, pasteurisation of the pulp (e.g. thermal treatment), enzymatic treatment and/or alkalinisation treatment and drying (preferably by freeze-drying, vacuum drying or spray-drying). The pasteurisation step may be any appropriate point in the process, e.g. may also be after enzyme treatment.

An embodiment of the present invention comprises the following steps: depulping, optional freezing, optional defrosting, enzymatic treatment, optional pasteurisation, alkalinisation and drying.

An embodiment of the present invention comprises the following steps: depulping, freezing, defrosting, enzymatic treatment, pasteurisation, alkalinisation and drying.

An embodiment of the present invention comprises the following steps: depulping, optional freezing, optional defrosting, alkalinisation, enzymatic treatment, pasteurisation and drying.

An embodiment of the present invention comprises the following steps: depulping, freezing, defrosting, alkalinisation, enzymatic treatment, pasteurisation and drying.

In the above embodiments, the alkalinisation step relates to pH adjustment and may occur before or after the enzymatic treatment, preferably after.

The present invention provides advantageous properties in respect of a reduction, or entire removal, of added sugar, with the sweetness being provided from a natural source, that also contains other components of the cocoa pod that contribute to the flavour of the chocolate.

In respect of added sugar, in an embodiment, the term "added sugar" refers to refined sugar, which encompasses processed sugars, e.g. white or brown sugars, which have their standard nutritional definitions. Preferably, as recited in Regulation (EC) No 1924/2006, the present invention relates to foodstuffs where sugars have not been added and the product does not contain any added mono- or disaccharides or any other food used for its sweetening properties other than sugars that are inherently naturally present in the ingredients.

Accordingly, the present invention provides an alternative for added sugars by providing naturally occurring sugars that are present in the source of cocoa mass, cocoa butter and/or cocoa powder. Thus, the present invention provides a non-added sugar confectionery product containing natural sugar.

Foodstuff, Confectionery and Chocolate Product
General Products of the Invention The present invention provides new foodstuffs comprising the materials of the present invention. However, the preferred foodstuffs are confectionery products, preferably chocolate products.

Other foodstuffs include a culinary product, a dairy product (for example a yogurt), a nutritional formula, or an ice cream. For baking, ice cream and topping applications, the material of the present invention (preferably in the form of a powder described below) may be used as a flavouring, preferably may be combined with cocoa powder to form a sweetened cocoa powder.

In an embodiment, compositions of the invention may usefully be chocolate products (as defined herein), more usefully be chocolate or a chocolate compound. Independent of any other legal definitions that may be used compositions of the invention that comprises a cocoa solids content of from 25% to 35% by weight together with a milk ingredient (such as milk powder) may be informally referred to herein as 'milk chocolate' (which term also encompasses other analogous chocolate products, with similar amounts of cocoa-solids or replacements therefor). Independent of any other legal definitions that may be used compositions of the invention that comprises a cocoa solids content of more than 35% by weight (up to 100% (i.e. pure cocoa solids) may be informally referred to herein as 'dark chocolate' (which term also encompasses other analogous chocolate products, with similar amounts of cocoa-solids or replacements therefor).

The term 'chocolate' as used herein denotes any product (and/or component thereof if it would be a product) that meets a legal definition of chocolate in any jurisdiction and also include product (and/or component thereof) in which all or part of the cocoa butter (CB) is replaced by cocoa butter equivalents (CBE) and/or cocoa butter replacers (CBR).

The term 'chocolate compound' as used herein (unless the context clearly indicates otherwise) denote chocolate-like analogues characterized by presence of cocoa solids (which include cocoa liquor/mass, cocoa butter and cocoa powder) in any amount, notwithstanding that in some jurisdictions compound may be legally defined by the presence of a minimum amount of cocoa solids.

The term 'chocolate product' as used herein denote chocolate, compound and other related materials that comprise cocoa butter (CB), cocoa butter equivalents (CBE), cocoa butter replacers (CBR) and/or cocoa butter substitutes (CBS). Thus, chocolate product includes products that are based on chocolate and/or chocolate analogues, and thus for example may be based on dark, milk or white chocolate.

Unless the context clearly indicates, otherwise it will also be appreciated that in the present invention, any one chocolate product may be used to replace any other chocolate product and neither the term chocolate nor compound should be considered as limiting the scope of the invention to a specific type of chocolate product. Preferred chocolate product comprises chocolate and/or compound, more preferred chocolate product comprises chocolate, most preferred chocolate product comprises chocolate as legally defined in a major jurisdiction (such as Brazil, EU and/or US).

The term 'choco-coating' as used herein (also refers to a 'choco-shell') denotes coatings made from any chocolate product. The terms 'chocolate coating' and 'compound coating' may be defined similarly by analogy. Similarly the terms 'choco-composition, (or mass)', 'chocolate composition (or mass)' and 'compound composition (or mass)' denote compositions (or masses) that respectively comprise chocolate product, chocolate and compound as component(s) thereof in whole or part. Depending on their component parts the definitions of such compositions and/or masses may of course overlap.

The term 'chocolate product confectionery as used herein denotes any foodstuff which comprises chocolate product and optionally also other ingredients and thus may refer to foodstuffs such confections, wafers, cakes and/or biscuits whether the chocolate product comprises a choco-coating and/or the bulk of the product. Chocolate product confectionery may comprise chocolate product in any suitable form for example as inclusions, layers, nuggets, pieces and/or drops. The confectionery product may further contain any other suitable inclusions such as crispy inclusions for example cereals (e.g. expanded and/or toasted rice) and/or dried fruit pieces.

The chocolate product of the invention may be used to mould a tablet and/or bar, to coat confectionery items and/or to prepare more complex confectionery products. Optionally, prior to its use in the preparation of a chocolate product confectionery product, inclusions according to the desired recipe may be added to the chocolate product. As it will be apparent to a person skilled in the art, in some instances the product of the invention will have the same recipe and ingredients as the corresponding composition and/or mass while in other instances, particularly where inclusions are added or for more complex products, the final recipe of the product may differ from that of the composition and/or mass used to prepare it.

In one strongly preferred embodiment of the invention, the chocolate product confectionery product comprises a substantially solid moulded choco-tablet, choco-bar and/or baked product surrounded by substantial amounts of chocolate product. These products are prepared for example by substantially filling a mould with chocolate product and optionally adding inclusions and/or baked product therein to displace chocolate product from the mould (so-called wet shelling processes), if necessary further topping up the mould with chocolate product. For such strongly preferred products of the invention the chocolate product forms a substantial or whole part of the product and/or a thick outside layer surrounding the interior baked product (such as a wafer and/or biscuit laminate). Such solid products where a mould is substantially filled with chocolate are to be contrasted with products that comprise moulded thin chocolate shells which present different challenges. To prepare a thin-coated chocolate shell a mould is coated with a thin layer of chocolate, the mould being inverted to remove excess chocolate and/or stamped with a cold plunger to define the shell shape and largely empty the mould. The mould is thus coated with a thin layer of chocolate to which further ingredients and fillings may be added to form the interior body of the product.

Unless the context herein clearly indicates, otherwise it will also be well understood by a skilled person that the term chocolate product confectionery as used herein can readily be replaced by and is equivalent to the term chocolate confectionery as used throughout this application and in practice these two terms when used informally herein are interchangeable. However, where there is a difference in the meaning of these terms in the context given herein, then chocolate confectionery and/or compound confectionery are preferred embodiments of the chocolate product confectionery of the present invention, a preferred embodiment being chocolate confectionery.

Preferred chocolate product confectionery may comprise one or more—ingredients, for example selected from the group consisting of: chocolate product(s), compound product(s), chocolate coating(s) and/or compound coating(s). The products may comprise uncoated products such as choco-bar(s) and/or choco-tablet(s) with or without inclusions and/or products coated with chocolate product such as coated biscuits, cakes, wafers and/or other confectionery items. More preferably and/or alternatively any of the aforementioned may comprise one or more cocoa butter replacer(s) (CBR), cocoa-butter equivalent(s) (CBE), cocoa-butter substitute(s) (CBS) and/or any suitable mixture(s) thereof.

In chocolate product confectionery, the cocoa butter (CB) may be replaced by fats from other sources. Such products may generally comprise one or more fat(s) selected from the group consisting of: lauric fat(s) (e.g. cocoa butter substitute (CBS) obtained from the kernel of the fruit of palm trees); non-lauric vegetable fat(s) (e.g. those based on palm or other specialty fats); cocoa butter replacer(s) (CBR); cocoa butter equivalent(s) (CBE) and/or any suitable mixture(s) thereof. Some CBE, CBR and especially CBS may contain primarily saturated fats and very low levels of unsaturated omega three and omega six fatty acids (with health benefits). Thus in one embodiment in chocolate product confectionery of the invention such types of fat are less preferred than CB.

One embodiment of the invention provides a multi-layer product optionally comprising a plurality of layers of baked foodstuff (preferably selected from one or more wafer and/or biscuit layers, and/or one or more fillings layers there between with at least one coating layer located around these layers foodstuff, the coating comprising a chocolate product of or prepared according to the invention.

A further embodiment of the invention provides a chocolate product confectionery product, further coated with chocolate (or equivalents thereof, such as compound) for example a praline, chocolate shell product and/or chocolate coated wafer or biscuit any of which may or may not be layered. The chocolate coating can be applied or created by any suitable means, such as enrobing or moulding. The coating may comprise a chocolate product of or prepared according to the invention.

Another embodiment of the invention provides a chocolate product confectionery product of and/or used in the present invention, that comprises a filling surrounded by an outer layer for example a praline, chocolate shell product.

In another preferred embodiment of the invention the foodstuff comprises a multi-layer coated chocolate product comprising a plurality of layers of wafer, chocolate product, biscuit and/or baked foodstuff, with filling sandwiched between them, with at least one layer or coating being a chocolate product (e.g. chocolate) of the invention. Most preferably the multi-layer product comprises a chocolate product confectionery product (e.g. as described herein) selected from sandwich biscuit(s), cookie(s), wafer(s), muffin(s), extruded snack(s) and/or praline(s). An example of such a product is a multilayer laminate of baked wafer and/or biscuit layers sandwiched with filling(s) and coated with chocolate.

Baked foodstuffs used in the invention may be sweet or savoury. Preferred baked foodstuffs may comprise baked grain foodstuffs which term includes foodstuffs that comprise cereals and/or pulses. Baked cereal foodstuffs are more preferred, most preferably baked wheat foodstuffs such as wafer(s) and/or biscuit(s). Wafers may be flat or shaped (for example into a cone or basket for ice-cream) and biscuits may have many different shapes, though preferred wafer(s) and/or biscuit(s) are flat so they can be usefully be laminated together with a confectionery filling of the invention (and optionally a fruit based filling). More preferred wafers are non-savoury wafers, for example having a sweet or plain flavour.

A non-limiting list of those possible baked foodstuffs that may comprise chocolate compositions that comprise chocolate product of and/or used in the present invention are selected from: high fat biscuits, cakes, breads, pastries and/or pies; such as from the group consisting of: ANZAC biscuit, biscotti, flapjack, kurabiye, lebkuchen, leckerli, macroon, bourbon biscuit, butter cookie, digestive biscuit, custard cream, extruded snacks, florentine, garibaldi gingerbread, koulourakia, kourabiedes, Linzer torte, muffin, oreo, Nice biscuit, peanut butter cookie, polvorón, pizzelle, pretzel, croissant, shortbread, cookie, fruit pie (e.g. apple pie, cherry pie), lemon drizzle cake, banana bread, carrot cake, pecan pie, apple strudel, baklava, berliner, bichon au citron and/or similar products.

Preferably the chocolate product of or prepared according to the invention may be suitable for use as (in whole or in part as a component) of one or more coatings and/or fillings.

The coating and/or filling may comprise a plurality of phases for example one or more solid and/or fluid phases such as fat and/or water liquid phases and/or gaseous phases such as emulsions, dispersions, creams and/or foams.

Therefore, broadly a further aspect of the invention comprises a foodstuff comprising chocolate product as described herein.

A yet further aspect of the invention broadly comprises use of a chocolate product of or prepared according to the invention as a chocolate product confectionery product and/or as a filling and/or coating for a foodstuff of the invention as described herein.

Specific Products of the Invention

In an embodiment of the present invention, the presence of the cocoa pulp and/or the extract of cocoa pulp affords a foodstuff product that is distinguished over products, specifically confectionery products, preferably chocolate products.

In a preferred embodiment, the present invention provides a composition that comprises pentanol-acetate, preferably 2-pentanol acetate, preferably the present invention provides a confectionery product that comprises pentanol-acetate, preferably 2-pentanol acetate, and most preferably a chocolate product that comprises pentanol-acetate, preferably 2-pentanol acetate.

In a preferred embodiment, the present invention provides a composition that comprises heptanol-acetate, preferably 2-heptanol acetate, preferably the present invention provides a confectionery product that comprises heptanol-acetate, preferably 2-heptanol acetate, and most preferably a chocolate product that comprises heptanol-acetate, preferably 2-heptanol acetate.

In a preferred embodiment, the combined amount of pentanol-acetate and heptanol-acetate to the amount of furfural present in the confectionery product, preferably chocolate, is present in a ratio of greater than 0.75:1.0, preferably greater than 1.50:1.0, for example preferably greater than 2.00:1.0, greater than 3.00:1.0, greater than 5.00:1.0 or greater than 6.50:1.0. In a preferred embodiment, the combined amount of pentanol-acetate and heptanol-acetate to the amount of linalool present in the confectionery product, preferably chocolate, is present in a ratio of less than 10.0:1.0 or less than 9.0:1.0, for example, between 0.75:1.0 and 10.0:1.0.

In a preferred embodiment, the combined amount of pentanol-acetate and heptanol-acetate to the amount of linalool present in the confectionery product, preferably chocolate, is present in a ratio of greater than 1.20:1.0, preferably greater than 1.40:1.0, for example preferably greater than 2.00:1.0, greater than 3.00:1.0, greater than 5.00:1.0 or greater than 6.50:1.0. In a preferred embodiment, the combined amount of pentanol-acetate and heptanol-acetate to the amount of linalool present in the confectionery product, preferably chocolate, is present in a ratio of less than 12.0:1.0 or less than 10.0:1.0, for example, between 1.20:1.0 and 12.0:1.0.

The above results are preferably obtained using GC-MS (Gas chromatography mass spectrometry), preferably the GC-MS protocol set out in the examples of this specification. The above results may be obtained from peak areas of the respective peaks when measured according to the standard mentioned in the examples.

In a preferred embodiment, the amount of pentanol-acetate is present in the confectionery product, preferably chocolate, in an amount such that the peak area ratio relative to the standard defined below is greater than 0.05:1.0, preferably greater than 0.10:1.0, preferably greater than 0.20:1.0, for example greater than 0.25:1.0, greater than 0.50:1.0 or greater than 1.0:1.0.

In a preferred embodiment, the amount of pentanol-acetate is present in the confectionery product, preferably chocolate, in an amount such that the peak area ratio relative to the standard defined below is less than 2.00:1.0, preferably less than 1.75:1.0, preferably less than 1.50:1.0, for example less than 0.75:1.0, less than 0.30:1.0 or less than 0.25:1.0. A preferred embodiment of the above, has a peak area ratio of from 0.05:1.0 to 2.00:1.0.

In a preferred embodiment, the amount of heptanol-acetate is present in the confectionery product, preferably chocolate, in an amount such that the peak area ratio relative to the standard defined below is greater than 0.03:1.0, preferably greater than 0.05:1.0, preferably greater than 0.10:1.0, for example greater than 0.15:1.0, greater than 0.20:1.0 or greater than 0.40:1.0.

In a preferred embodiment, the amount of pentanol-acetate is present in the confectionery product, preferably chocolate, in an amount such that the peak area ratio relative to the standard defined below is less than 1.00:1.0, preferably less than 0.85:1.0, preferably less than 0.75:1.0, for example less than 0.65:1.0, less than 0.60:1.0 or less than 0.50:1.0. A preferred embodiment of the above, has a peak area ratio of from 0.03:1.0 to 1.00:1.0.

In an embodiment of the present invention, the foodstuff, preferably confectionery product, comprises between 5% and 65% by weight of the foodstuff, preferably confectionery product, of cocoa pulp (preferably dried) or cocoa pulp extract (preferably dried), preferably between 10% and 65%, more preferably between 15% and 60%, more preferably between 20% and 60%, for example between 20% and 55%, 20% and 40%, 34% to 58% or 37% to 50%.

In an embodiment of the present invention provided is a composition that comprises cocoa pulp or a cocoa pulp extract and cocoa mass, preferably wherein a portion (preferably all) sugar in the composition is provided by the cocoa pulp cocoa pulp extract.

In an embodiment of the present invention, the cocoa pulp or the extract of cocoa pulp, preferably in the form of a powder, is dispersed throughout the confectionery product. In a preferred embodiment, the cocoa pulp or the extract of cocoa pulp is or the extract of cocoa pulp is dispersed within a continuous fat phase of the confectionery product, preferably is dispersed with the cocoa butter phase. In a preferred embodiment, the cocoa pulp or the extract of cocoa pulp is a dried powder that is dispersed in a cocoa butter matrix in the confectionery product.

In an embodiment of the present invention, the cocoa pulp or the extract of cocoa pulp may be in the form of inclusions, preferably of size 0.5-15.0 mm, e.g. 1.0-10.0 mm. In an embodiment, this particle size may be measured with a ruler for 10 or more sample pieces, preferably 10, and averaged, with the longest diameter assessed by eye.

In a preferred embodiment, is the inclusions may be dispersed within a continuous fat phase of the confectionery product, preferably is dispersed with the cocoa butter phase.

Alternatively, the powder and/or inclusions may be present in a filling of a confectionery, preferably in a filling of a chocolate product.

In an embodiment of the present invention, the cocoa pulp or the extract of cocoa pulp is the main source of sugar in the foodstuff, preferably a confectionery product, preferably the cocoa sugar constitutes over 60% by weight of the sugar in the foodstuff, preferably confectionery product, preferably over 75%, more preferably over 80%, more preferably over 85%, more preferably over 90%, more preferably over 95% and more preferably 100%.

In an embodiment of the present invention provided is a composition that comprises a cocoa pulp extract and cocoa mass, without added sugar.

In an embodiment, the confectionery product comprises between 0% and 95% by weight of the confectionery product of cocoa mass dependent on the end product, preferably between 0% and 85%, for example, between 45% and 80%, less than 5% or between 8% and 12% by weight of the confectionery product of cocoa mass.

In an embodiment, the confectionery product comprises between 0% and 35% by weight of the confectionery product of cocoa butter dependent on the end product, preferably between 0% and 30%, for example, between 6% and 15%, less than 5% or between 20% and 35% by weight of the confectionery product of cocoa butter. In an embodiment, the addition of cocoa butter is independent of any present in the cocoa mass.

In an embodiment of the present invention, the chocolate product is selected from the group consisting of milk chocolate, dark chocolate and white chocolate.

In the present invention, the cocoa mass consists essentially of cocoa solids and cocoa butter.

In an embodiment, the cocoa mass is cocoa liquor, preferably in solid or semi-solid at ambient temperature (e.g. 20° C.). In an embodiment, the cocoa liquor may be steam-treated. In an embodiment, the cocoa mass may be Arriba cocoa mass.

In an embodiment, the composition consists essentially of cocoa mass and cocoa pulp extract or consist essentially of cocoa mass and dried cocoa pulp.

In this invention, the term "consists essentially" of means at least 95.0 wt %, more preferably at least 97.5 wt %, more preferably at least 98.0 wt % and more preferably at least 99.0 wt %, preferably up to and including 100.0 wt %.

In an embodiment, the present invention provides a chocolate that consists of cocoa mass and cocoa pulp extract.

In an embodiment, the composition further comprises at least one component selected from the group consisting of a flavoring, milk-based component, an emulsifier, cocoa butter and an additional sugar, preferably at least one component selected from the group consisting of a milk-based component, an emulsifier, and cocoa butter.

In an embodiment, the composition further comprises at least one component selected from the group consisting of a milk-based component, an emulsifier and cocoa butter, preferably at least one component selected from the group consisting of a milk-based component, an emulsifier, and cocoa butter.

In an embodiment, if cocoa butter is used in addition to cocoa mass, the additional cocoa butter is used in an amount of less than 20% by weight of the chocolate product composition, preferably less than 15% by weight and preferably greater than 2.5% by weight, preferably greater than 5.0% by weight, for example between 2.5% and 20%.

In an embodiment of the present invention, the milk-based component is selected from the group consisting of non-fat milk solids, milk powder (optionally full cream, skimmed or semi-skimmed) and milk fat. In an embodiment, the milk products may be spray dried within the standard parameters for the production of these known products.

In an embodiment, the emulsifier is selected from the group consisting of lecithin, polyglycerol polyricinoleate and ammonium phosphatide. In an embodiment, the amount of emulsifier may be between 0.05 and 1.0% by weight of the composition, preferably between 0.1% and 0.5%. Alternatively, an emulsifier may not be present In an embodiment, the flavoring may be any that is typically used in chocolate manufacture, for example, vanilla-based/extract (e.g. vanillin) or hazelnut-based/extract (e.g. hazelnut paste or oil).

In an embodiment, the composition comprises inclusions. The inclusions may be any that are commonly used in the art, for example, fruit-based inclusions, nut-based inclusions, cereal-based inclusions and yogurt-based inclusions, for example. The inclusions may take the form of those commonly used, for example chips, flakes etc. The inclusions may be present in an amount of from 2.5% to 25% based on the weight of the chocolate product.

In an embodiment, the present invention relates to a white chocolate composition, for example a composition that comprises between 10% and 65% by weight of cocoa pulp (preferably dried) or cocoa pulp extract (preferably dried), and between 20% and 60% milk powder (optionally a mixture of whole and skimmed milk powder).

Specific, non-limiting chocolate recipes are now described. In all embodiments below, the percentages relate to wt % of the total chocolate product.

In an embodiment, the chocolate product composition comprises:
45-80% of cocoa mass
10-55% of the cocoa pulp extract of the present invention
0-5% of cocoa butter
0.0-0.5% of lecithin In an embodiment, the chocolate product composition comprises:
8-12% of cocoa mass
34-58% of the cocoa pulp extract of the present invention,
18-25% of cocoa butter
3.5-6.5% of milk fat
15-30% of milk powder
0.3-0.5 of lecithin In an embodiment, the chocolate product composition comprises:
37-50% of the cocoa pulp extract of the present invention,
18-24% non-fat milk solids
4-7% of milk fat
22-35 of (optionally deodorised) cocoa butter
20-40% of milk powder
0.2-0.5 of lecithin In an embodiment of the present invention, the chocolate products are prepared process that include the traditional fermentation and roasting processes of cocoa beans that are well known in the art.

In an embodiment, the *Theobroma* genus pods are unfermented, under-fermented or fermented. In an embodiment, the above terms may be defined as follows. Fermentation is normally performed between 2 and 6 days, depending on the variety, origin and what flavour is to be delivered. Unfermented means no intentional fermentation occurs and under fermented is less than 2 days of fermentation.

In an alternative embodiment, the chocolate products of the invention are non-roasted. Non-roasted denotes the composition is produced by a non-roasting process in which the cocoa-solid components thereof (such as cocoa beans, nibs and the like) are not subject to a high temperature (140° C. or higher, or 120° C. or higher, for example) for a lengthy time (for example, 30 minutes or more). Without wishing to be bound by any mechanism it is believed that in a non-roasting process the conditions are either insufficiently high in temperature (preferably below 120° C., more preferably less than or equal to 110° C., even more preferably less than or equal to 100° C., most preferably less than or equal to 90° C., for example less than or equal to 80° C.) and/or of sufficiently short duration (preferably less than 30 minutes, more preferably less than 20 minutes, even more preferably less than 10 minutes, most preferably less than 5 minutes, for example less than 4 minutes) so undesired chemical reactions such as the Maillard reaction are not allowed to develop to any great extent and thus significant amounts of flavour active compounds are not generated which might otherwise impart strong roasted notes to the composition. A roasting process or step is to be distinguished from treatments such as flash heating where raw ingredients such as cocoa beans and/or nibs may be treated at high temperatures (typically 120° to 160° C.) for a very short period (typically no more than 200 seconds) to deactivate any microbial contaminants to make the ingredient safe for human consumption. Such anti-microbial and/or de-bacterising treatments and/or steps are still considered within the scope of a non-roasting process.

The present invention thus provides a chocolate product from one source, i.e. cocoa pods.

Accordingly, the present invention provides a process for preparing a confectionery product where the ingredients of the confectionery product are combined with cocoa pulp, preferably dried, or cocoa pulp extract.

In a preferred embodiment, the present invention also provides a process for producing a confectionery foodstuff, comprising the steps of:
a. treating cocoa pulp or an extract of cocoa pulp to reduce the polysaccharide content and/or treating cocoa pulp or an extract of cocoa pulp to adjust the pH,
b. drying the product of step a., and
c. combining the product of step b. with at least one other ingredient present in the confectionery foodstuff.

In a preferred embodiment, the above process relates to the preparation of a chocolate product, preferably chocolate, and the at least one other ingredient is a cocoa mass.

In an embodiment of the present invention, provided is a process for producing a chocolate product where all ingredients are from a cocoa pod, i.e. the chocolate product consists essentially of ingredients derived from a cocoa pod.

In an embodiment of the present invention, in the production of a chocolate product the dried cocoa pulp or cocoa pulp extract is combined with the other ingredients at the point where added sugar is normally introduced.

In an embodiment of the present invention, provided is a process for preparing a chocolate product comprising the steps of combining a cocoa mass and a cocoa pulp or an extract of cocoa pulp. In an embodiment, the combining of the cocoa pulp or extract of cocoa pulp may be done by any device traditionally used to combine sugar with a cocoa mass as used in the traditional production of chocolate.

In an embodiment, the chocolate composition of the present invention may be refined using known equipment as applicable. In a preferred embodiment, the chocolate is refined to ensure a non-grainy texture. For example, the refining may be carried out to achieve a particle size (D90 measured by a Malvern Mastersizer 3000) of less than 50 microns, preferably between 15 microns and 35 microns.

In an embodiment, the traditional conching process is used to prepare the chocolate. In a preferred embodiment, the temperature in the conching step does not exceed 60° C., preferably does not exceed 57.5° C. and preferably does not exceed 56° C. By controlling the temperature during this step, caramelisation of the pulp is avoided and the texture of the final product is not grainy. In a preferred embodiment, the temperature is greater than 30° C., preferably greater than 35° C. or greater 40° C. or greater than 45° C.

In an embodiment, the conching is carried out for a period of greater than 1.5 hours, preferably greater than or equal to 2 hours, preferably greater than or equal to 2.5 hours. In an embodiment, the conching is carried out for a period of less than 8 hours, preferably less than 6 hours.

In an embodiment, the conching is carried out for a period of between 1.5 hours and 8 hours at a temperature between 30° C. and 60° C.

In an embodiment, the conching speed is between 200 rpm and 2000 rpm, preferably between 400 rpm and 1600 rpm.

In a preferred embodiment, the cocoa pulp and/or cocoa pulp extract is not caramelised, for example, the process steps used to produce the composition of the invention do not lead to caramelisation.

In an embodiment, the conching speed and/or temperature may vary over the conching step within the above ranges.

Unless defined otherwise, all technical and scientific terms used herein have and should be given the same meaning as commonly understood by one of ordinary skill in the art to which this invention belongs.

Unless the context clearly indicates otherwise, as used herein plural forms of the terms herein are to be construed as including the singular form and vice versa.

In all ranges defined above, the end points are included within the scope of the range as written. Additionally, the end points of the broadest ranges in an embodiment and the end points of the narrower ranges may be combined.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole. Preferably, where appropriate (for example in amounts of ingredient) such percentages are by weight.

Unless otherwise specified, the percentages listed are by weight.

The present invention is further described by reference to the non-limiting specific examples.

EXAMPLES

The following compositions within the scope of the invention were prepared:

TABLE 1

| Ingredient | Example 1 Dark chocolate 36 wt % of pulp | Example 2 Dark chocolate with 20 wt % pulp | Example 3 Dark chocolate 20 wt % pulp + strawberry pieces | Example 4 White chocolate with 25 wt % pulp |
|---|---|---|---|---|
| Cocoa butter | 10.90 | 6.00 | 5.82 | 32.92 |
| Whole milk powder | — | — | — | 31.93 |
| Skimmed milk powder | — | — | — | 9.98 |
| Cocoa liquor | 52.68 | 73.97 | 71.75 | — |

TABLE 1-continued

| | | | | |
|---|---|---|---|---|
| Cocoa pulp powder | 36.42 | 20.03 | 19.43 | 24.94 |
| Natural vanilla | — | — | — | 0.03 |
| Lecithin | — | — | — | 0.20 |
| Strawberry pieces | — | — | 3.00 | — |
| TOTAL | 100.00 | 100.00 | 100.00 | 100.00 |

| | Example 1 | Example 4 |
|---|---|---|
| Mixing/kg | | |
| Cocoa butter | | 1.67 |
| Whole milk powder | | 2.55 |
| Skimmed milk powder | | 0.80 |
| Cocoa liquor | 2.90 | |
| Cocoa pulp powder | 2.00 | 2.00 |
| Natural vanilla | | 0.0021 |
| Conching/kg | | |
| Cocoa butter | 0.60 | 0.96 |
| Refined Mass | 4.91 | 7.02 |
| Lecithin | | 0.02 |

Preparation of Cocoa Pulp Powder for Examples 1 to 4

Cocoa pods of varieties PH16, Salobrinho and CCN51 were washed in running water. They were then immersed in chlorinated water containing 200 mg/L of free chlorine for 10 minutes. They were then washed with chlorinated water containing 5 mg/L of free chlorine by spraying.

The fruits were broken manually with the help of stainless steel knives. Then, the pulp seeds were separated from the bark.

The pulping was performed on a commercially available fruit pulper using a brush system. The pulp was collected directly in 40×50 cm polypropylene plastic bags, which were sealed under vacuum. After packing, the pulps were frozen and stored in Cold Lab ultra-freezer at −80° C.

Lyophilization of the cocoa pulp was conducted on Lio Top equipment for 96 hours in two batches. In each batch, 8 trays were placed with 2.5-3.0 kg/tray.

After the lyophilization process was complete, the trays with dehydrated pulp were removed from the equipment. The lyophilized pulp was removed from the trays and placed in rolled bags, which were then vacuum sealed, providing freeze-dried cocoa pulp powder.

Preparation of Chocolate Compositions

Example 1

The cocoa pulp powder produced above was brought to room temperature and was mixed with cocoa liqueur using a standard kitchen food processor (a Crypto mill mixer).

A Buhler SDY 200 3-cylinder refiner was used to reduce the particle size to 23 microns (measured by hand using a micrometer). The cylinder spacing was controlled by setting the pressures on the refiner (gauge readings—right 0.7, 7; left 0.4, 6.4; right exit 0, 11.8 and left exit 0.8, 7.8).

The refined composition was then subjected to conching in an Elkolino ELK-0005-V device with the following parameters: Before starting the conching step, add 100 g cocoa butter into the conche, process at 45° C., time 10 minutes, 500 rotations/minute, and then change the temperature and rotation to 56° C., time 220 minutes, 1200 rotations/minute. Add 500 g cocoa butter and change the temperature to 45° C., 60 minutes, 1500 rotations/minute.

The chocolate was then tempered at 29.8° C. by hand on a marble-topped table.

Example 2

This example was prepared according to the process set out for Example 1 but with the amount of cocoa pulp powder modified as shown by Table 1.

Example 3

This example was prepared according to the process set out for Example two but the refining step provided a particle size of 41 microns and strawberry pieces were added in the amount specified.

Example 4

A white chocolate was prepared in contrast to the above dark chocolates.

The milk powders, cocoa pulp powder, natural vanilla and a portion of the cocoa butter (64% of the total cocoa butter in the final product) were combined using a kitchen food processor. The composition was refined to provide a particle size of 32 microns. The remaining cocoa butter and refined mass were added to a laboratory Lipp conche and were processed for 2 hours at a temperature between 45-50° C. to provide the final product.

The chocolate compositions were found to have a fruity, floral taste that distinguishes them from chocolate compositions that did not use cocoa pulp as a sugar-replacement.

Preparation of Cocoa Pulp Powder for Examples 5 to 6

Cocoa pods of varieties PH16, Salobrinho and CCN51 were washed in running water. They were then immersed in chlorinated water containing 200 mg/L of free chlorine for 10 minutes. They were then washed with chlorinated water containing 5 mg/L of free chlorine by spraying.

The fruits were broken manually with the help of stainless steel knives. Then, the pulp seeds were separated from the bark.

The pulping was performed on a commercially available fruit pulper using a brush system. The pulp was collected directly in 40×50 cm polypropylene plastic bags, which were sealed under vacuum. After packing, the pulps were frozen and stored at −18° C.

Example 5

Initially the pulps were thawed. Then, for the enzymatic treatment, batches of 3.0 kg of pulp were placed in a jacketed reactor and the temperature was raised to 42.5° C. with the aid of a thermostatic bath, when the temperature was reached, the enzyme (Pectinex® Ultra Clear, Novozymes) was added under the following conditions:

Concentration: 1 mL of enzyme/100 g of pulp
Temperature: 42.5° C.
Reaction time: 60 minutes
Rotation 100 rpm Shortly after the enzymatic treatment, heat treatment was performed at 90° C. for 5 minutes and cooling at 20° C. The cooled material was frozen for further lyophilisation treatment.

Example 6

At the end of the 60 minutes of enzymatic reaction described in Example 5, a sample was taken and enough calcium hydroxide was added to the pulp to adjust the pH to approximately 5.0. The following conditions were used:

12.9 g of Ca(OH)2 were added to each 3 kg of pulp (0.43%);
Mixing was carried out with the mixer at a speed of 200 rpm for about 15 minutes; and
The pasteurization was then carried out at 90° C. for 5 minutes and cooled to 20° C.

The cooled material was frozen and taken to lyophilization.

Lyophilization of the cocoa pulp was conducted on Lio Top equipment for 96 hours in two batches. In each batch, 8 trays were placed with 2.5-3.0 kg/tray.

After the lyophilization process was complete, the trays with dehydrated pulp were removed from the equipment. The lyophilized pulp was removed from the trays and placed in rolled bags, which were then vacuum sealed, providing freeze-dried cocoa pulp powder.

Testing

Prior to lyophilisation, the pH of the natural pulp, the enzymatically treated pulp and the bi-treated pulp were found to be 3.52±0.32, 3.36±0.02 and 4.77±0.05 at 20° C., respectively, based on the mean of two sets of measurements.

Viscosity measurements were taken based on the mean of two sets of measurements using a Brookfields RVDV III rheometer at 30° C. with rotation for 60 s.

Apparent viscosity (100 rpm) Apparent viscosity (250 rpm) for natural pulp, 611.5±2.12 and 322.5±3.53, pulp enzymatically treated 400.0±14.14 and 162.5±10.60 and pulp enzymatically treated with pH adjustment 392.5±12.43 and 158±11.32 (all results are reported in centipoise).

Accordingly, it can be seen that the treatment of the present invention provides a reduction in viscosity.

Example 7

The compositions prepared in Examples 5 and 6 were processed into chocolate compositions using the earlier defined process for Example 1, with the exception the pulp composition was included at 33% by weight of the final product, the cocoa mass at 53% and the cocoa butter at 14% and the conching temperature was 50° C.

Upon informal tasting by a small panel, the pre-treatment of the pulp provided a chocolate with quicker melting and lower residence time in the mouth properties, as compared to the non-pre-treated pulp.

Example 8

The PH16 and Salobrinho cocoa pulp samples from the above preparation sample were assessed using GC-MS with 500 mg samples. The protocol was as follows:

Preparation of Standard:

100 (±1) mg of methyl valerate was weighed into a 10 mL volumetric flask. The flasks were topped up to 10 mL with methanol to obtain the stock solutions of concentrations of 10 g/L. Until use, the solutions were stored in a freezer at approximately −30° C. To prepare the working solutions 50 µL of the stock solution was pipetted into a 100 mL volumetric flask containing approx. 30 mL water. Afterwards the flask was topped up to 100 mL with water and the mixture was homogenised. The working solution was added directly to the sample prior to analysis. The working solution was prepared freshly for different tests.

500 (±5) mg of powdered cocoa pulp was weighed precisely into a 20 mL headspace vial. Afterwards 4 mL of purified water and 50 µL of the working solution were added. The vial was sealed, the mixture was homogenized and the volatile components were extracted from the sample using solid phase micro extraction (SPME). The samples were analyzed in duplicate by means of gas chromatography mass spectrometry (GC-MS). SPME was carried out automatically using a CTC CombiPAL (CTC Analytics, Zwingen, Switzerland). The sample was incubated for 30 min at 60° C. and 300 rpm. Afterwards the volatiles were absorbed onto a divinylbenzene/carboxen/polydimethylsiloxane (DVB/CAR/PDMS) coated fiber (50/30 µm, stable flex/SS, 1 cm, Supelco, Bellefonte, USA) for 30 min at 60° C. and 300 rpm. The odorants were then desorbed into the GC-MS inlet for 10 min at 240° C., venting to split after 2 min. The fiber was re-used without any additional conditioning for the next extraction.

The samples were analyzed using an Agilent 6890 N gas chromatograph (Agilent, Stockport, UK) and an Agilent 5973 Network MSD (Agilent, Stockport, UK). Gas chromatographic separation was carried out on a BP-20 column (60 m×0.25 mm i.d.; film thickness 0.25 µm; SGE Analytical Science, Milton Keynes, UK). The sample was injected in splitless mode using an inlet temperature of 240° C. Helium was used as the carrier gas (flow=1.5 mL/min). The mass spectrometer was operated in scan mode from m/z 30 to 300 in electron impact (EI) mode using an electron energy of 70 eV. The GC-MS transfer line, ion source and quadrupole temperatures were 280° C., 230° C. and 150° C. respectively. The oven program started with an isothermal step at 40° C. for 5 min and was ramped to 240° C. at 5° C./min. The oven was then held at 240° C. for 10 min.

The GC-MS data files were converted into MassHunter compatible files using MassHunter GC/MS Translator® B.07.00 (Agilent, Waldbronn, Germany). These files were afterwards imported into MassHunter Unknown Analysis® B.06.00 (Agilent, Waldbronn, Germany). Deconvolution was performed using an asymmetric window of 0.3 amu to the left and 0.7 amu to the right. Identification was achieved by comparison of the spectra for the deconvoluted peak with the commercially available NIST Mass Spectral Library. Positive hits were revised manually. The peak areas of the target analytes were extracted using m/z values by means of MassHunter Quantitative Analysis® software B.06.00 (Agilent, Waldbronn, Germany). For each analyte the area ratio (peak area (analyte)/peak area (internal standard)) was calculated and averaged over the repetitions (4 repeats).

| compound | m/z | retention time [min] |
| --- | --- | --- |
| methyl valerate (internal standard) | 74 | 11.93 |
| furfural | 95 | 23.27 |
| 2-pentanol acetate | 87 | 11.62 |

| compound | m/z | retention time [min] |
|---|---|---|
| 2-heptanol acetate | 87 | 17.74 |
| linalool | 93 | 25.43 |

The results are displayed in FIG. 1.

Example 9

Cocoa mass blends at a weight ratio of 60/40 for 1. Sucrose, 2. Salobrinho and 3. PH16 were prepared with a cocoa mass from the Ivory Coast.

Figure 2:
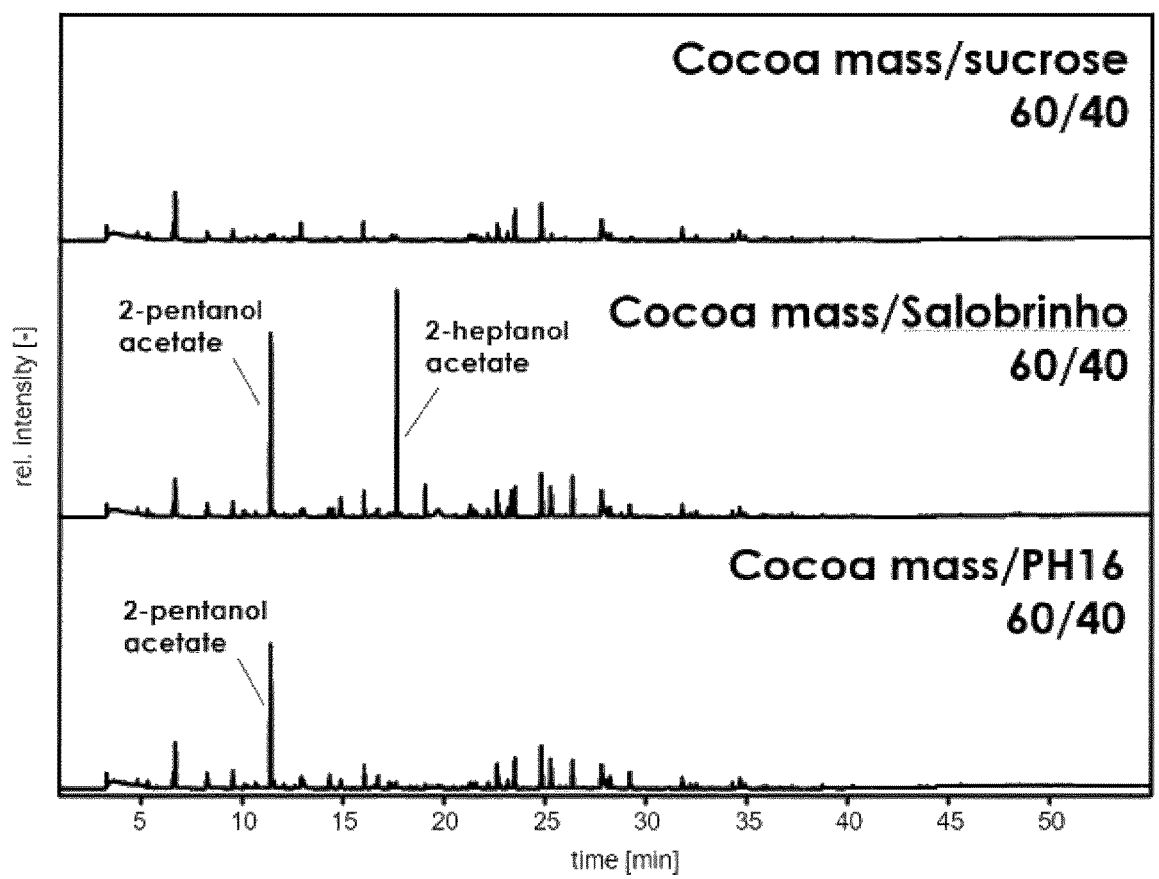

The results are displayed in FIG. 2.

Example 10a

Figure 3:
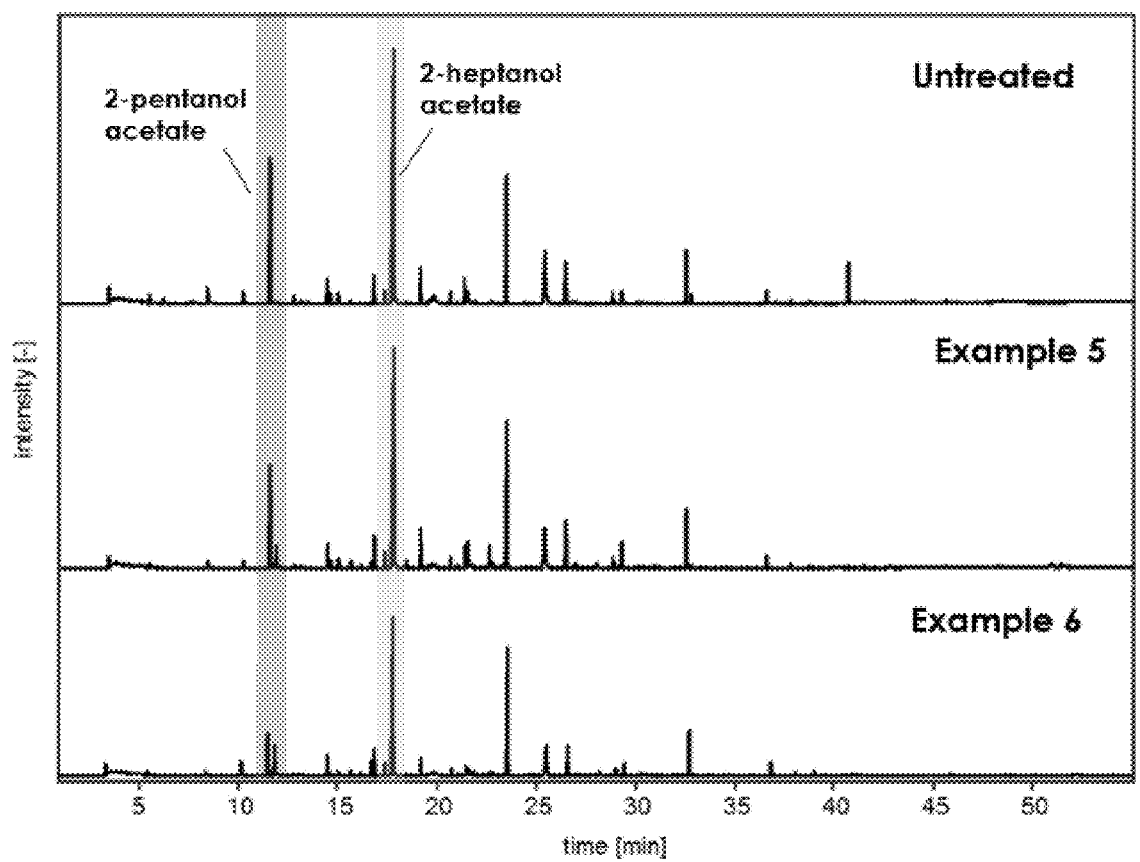

The cocoa pulp samples of Examples 5 and 6 were tested as above and the results are displayed in FIG. 3.

Example 10b

The compositions of Example 7 and a reference sample with 33% sucrose were analysed using the above procedures to obtain peak area ratios.

| | 2-pentanol acetate | 2-heptanol acetate | furfural | linalool |
|---|---|---|---|---|
| Reference Dark Chocolate, 33% sucrose | 0.03736 | 0.02803 | 0.10095 | 0.05617 |
| StDev | 0.00122 | 0.0005 | 0.00241 | 0.0017 |
| Dark Chocolate 33% Example 5 | 0.2536 | 0.56072 | 0.32442 | 0.10858 |
| StDev | 0.00238 | 0.02602 | 0.01496 | 0.00781 |
| Dark Chocolate 33% Example 6 | 0.28118 | 0.48668 | 0.13354 | 0.10877 |
| StDev | 0.00418 | 0.01844 | 0.00556 | 0.00371 |

Example 11

Cocoa pulp from a variety of cocoa plants was obtained and frozen at −20° C. and then defrosted before undergoing pH adjustment and/or enzymatic treatment. The initial pH of the pulp was 3.0.

pH Adjustment:

1.4 g Ca(OH)$_2$ to 500 g Pulp→pH 4

2.0 g Ca(OH)$_2$ to 500 g Pulp→pH 4.5

3.0 g Ca(OH)$_2$ to 500 g Pulp→pH 5

Enzymatic Treatment:

500 g Pulp+(2.0 g) Ca(OH)$_2$+5 mL Depol™→pH 4.5, 2 h, 43° C.

500 g Pulp+(3.5 g) Ca(OH)$_2$+5 mL Depol™→pH>6, 2 h, 43° C.

The enzymes were inactivated by treatment for 1 hour at 100° C. in a stove and dried at 80° C. in stove, with 500 cm$^2$ drying surface (a 25×20 cm tray).

| | | Mass/g, pre- and after drying at 80° C. | | |
|---|---|---|---|---|
| Sample | Viscosity/cm | Pre | 1 hour | 9 hour |
| No enzyme, pH 3 (natural) | 4.9 cm | 50 g | 8.4 g | 8.3 g |
| No enzyme, pH 4.5 | 4.7 cm | 50 g | 9.4 g | 8.3 g |
| No enzyme, pH 5 | 4.4 cm | 50 g | 11.2 g | 9.3 g |
| No enzyme, pH > 6 | 0.5 cm | 50 g | 11.8 g | 9.6 g |
| + Depol™ 793 L, pH 4.5 | 5.0 cm | 220 g | 117.5 g | 57.6 g |
| + Depol™ 793 L, pH > 6 | 0.5 cm | 400 g | 171.2 g | 75.8 g |

The viscosity was measured using a Bostwick consistometer, time fixed to 30 sec and then recording of travelling distance in cm. Measurement carried out when sample cooled to ambient temperature (20.0° C.).

Accordingly, the present invention provides materials that are able to be more easily processed during foodstuff manufacture, preferably during manufacture of chocolate-based confectionery owing to the viscosity reduction.

The chocolate compositions produced using the pre-treated cocoa pulps were easier to produce owing to the enzyme treatment providing an ingredient that was easier to handle and process into chocolate products.

Example 12

The cocoa pulp powders from the preparation example above and Examples 5 and 6 were assessed using HPAEC-PAD to determine the sugar contents using the below procedure:

Samples are dissolved in deionised water at a pH above at room temperature, heated at 70° C. for 27 minutes, cooler and centrifuged and a diluted aliquot is prepared. The aliquot is filtered using a 0.2 micron syringe and sugars are separated using an anion exchange polystyrene-divinylbenzene column with aqueous sodium hydroxide as eluent and the eluted carbohydrates are detected using PAD.

| Sugars | Preparation Example 1/ PH16 | Preparation Example 1/ Salobrino | Example 5 | Example 6 |
|---|---|---|---|---|
| DISACCHARIDES | | | | |
| Lactose (g/100 g) | Trace | Trace | Trace | Trace |
| Maltose (g/100 g) | Trace | Trace | Trace | 0.38 |
| Sucrose (g/100 g) | 14.75 | 28.19 | 3.91 | 2.26 |
| MONOSACCHARIDES C6-BODIES | | | | |
| Fructose (g/100 g) | 30.51 | 24.78 | 34.28 | 34.48 |
| Fucose (g/100 g) | Trace | Trace | Trace | Trace |
| Galactose (g/100 g) | Trace | Trace | Trace | Trace |
| Glucose (g/100 g) | 28.94 | 23.12 | 33.24 | 33.47 |
| Rhamnose (g/100 g) | Trace | Trace | Trace | Trace |
| TOTAL SUGAR g/100 g | 74.2 | 76.09 | 71.43 | 70.59 |

The cocoa varieties tested in Examples 5 and 6 are different from those in Preparation Example 1. Additionally, the total sugar content relates to the sugars measured—e.g. does not include any oligosaccharides that may be present.

Example 13

30 g of cocoa pulp from the same source as used in Example 11 was introduced into a Rapid Viscosity Analyser (RVA) aluminium cup and stabilized for 5 min at 40° C. under stirring at 50 rpm. Then, 150 µL of liquid enzyme or 150 mg of enzyme powder was added dependent on the enzyme form. Stirring was increased to 960 rpm for 8 s and went back to 50 rpm, temperature remained at 40° C. Temperature was maintained at 40° C. for additional 45 min prior to increase up to 90° C. for inactivation of the enzyme for 10 min. Average viscosity was calculating the average of the values obtained between time 41 and 49 min of each run. Reduction of viscosity was calculated based on the loss of viscosity versus non-treated sample and was expressed as a percentage.

The polygalacturonase activity was measured at 40° C., hydrolysing polygalacturonic acid (Megazyme P-PGAT) at 5.0 g/mL in 100 mM acetate buffer pH 4.5. Samples were taken out after exactly 2, 4, 6, 8, 10 and 12 min to establish kinetic curves. DNS reagent solution (1% 3,3-dinitrosalicylic acid+1.6% NaOH+40% K Na tartrate tetrahydrate) was immediately added to stop the enzymatic reaction and color the released reducing ends, boiling the samples for 10 min. Finally, the Absorbance was read at 540 nm. Galacturonic acid was used as standard to establish the calibration curve.

Enzyme assay: modified endo-cellulase CellG5 kit procedure from Megazyme. The cellulase activity was measured at 37° C., in 100 mM acetate buffer pH 4.5 containing 1 g/L bovine serum albumin. The enzymatic reaction was stopped after exactly 2, 4, 6, 8, 10 and 12 min to establish kinetic curves, adding 2% TRIS buffer pH 10.0. Finally, the absorbance was read at 405 nm. P-nitrophenol was used as standard to establish the calibration curve. An average of 3 readings was taken.

| Enzyme | Reduction in viscosity/% | Activity/PGN micromole/min/g | Activity/Cellulase/micromole/min/g |
|---|---|---|---|
| Cellulosin GMY (Ueda) | 96.3 | | 2500 |
| Cellulase FG conc | 93.9 | | 2380 |
| Rapidase ® Fibre (DSM) | 73.3 | 2599 | |
| Pectinex ® Ultra Clear (Novozyme) | 72.7 | 10347 | |
| Rohapect ® B1L (AB Enzymes) | 72.4 | | 333 |
| Pectinex ® UF(Novozyme) | 71.7 | 3573 | |
| Pectinex ® Ultra Color (Novozyme) | 71.6 | 9609 | |
| Klerzyme 150 (DSM) | 69.9 | 4342 | |
| Pectinex ® Ultra SP-L (Novozyme) | 69.8 | 3596 | |
| Cellulosin HC (Ueda) | 68.6 | | 514 |
| Hemicellulase conc (Sigma) | 61.3 | | 142 |
| Maxinvert L10000 (DSM) | 4.79 | 0 | 0 |
| Aromase ® (Amano Enzyme Europe) | 1.23 | 41 | 5 |

Example 14

The following studies were carried out. 100 g pouches of frozen cocoa pulp were purchased from Ricaeli. The reference pulp viscosity was 9.5 cm as measured using the Bostwich consistometer set out above. 800 g of pulp at 4.5 pH was used.

| Enzyme Loading/vol % (ml) | Enzyme Treatment time/hour | Temperature/deg C. | Ca(OH)$_2$ 20 w/v %-g/100 ml/ml | Viscosity/cm | Reduction in viscosity/% |
|---|---|---|---|---|---|
| 0.5 | 0.75 | 30 | 5 | 12 | 33 |
| 0.5 | 3.25 | 30 | 5 | 13 | 44 |
| 0.5 | 5.25 | 30 | 5 | 13.5 | 50 |

The above samples were made into chocolate using the same process as Example 1 and Example 11. Upon tasting by a small informal panel, the pre-treatment of the pulp provided a chocolate with quicker melting and lower residence time in the mouth properties, as compared to the non-pre-treated pulp.

Embodiments of the present invention are defined in the following numbered clauses:

1. A confectionery product comprising pulp from a plant in the *Theobroma* genus, preferably cocoa pulp, or an extract of pulp from a plant in the *Theobroma* genus, preferably, cocoa pulp.
2. The confectionery product of clause 1, wherein the confectionery product is a chocolate product, preferably chocolate.
3. The confectionery product of clauses 1 or 2, wherein the pulp or the extract of pulp provides a source of sugar to the confectionery product, wherein the pulp or the extract of pulp is the main source of sugar in the confectionery product.
4. The confectionery product of any of clauses 1 to 3, wherein the confectionery product is a chocolate product that comprises the extract of pulp, dried pulp or dried extract of pulp.
5. The confectionery product of any of clauses 1 to 4, wherein the extract of pulp comprises components selected from the group consisting of sugars, fibers, hydrocolloids, proteins, acids, polyphenols, phenolic-polymers, polysaccharides, and methylxanthines and combinations thereof.
6. The confectionery product of clause 5, wherein the extract of pulp comprises cocoa sugar, preferably the cocoa sugar is selected from the group consisting of sucrose, fructose and glucose and combinations thereof.
7. The confectionery product of clause 6, wherein the extract of pulp comprises between 20% and 95% by weight of pulp sugar based on the total weight of the extract preferably comprises between 60% and 95% by weight of cocoa sugar based on the total weight of the extract.
8. The confectionery product of any of clauses 1 to 7, wherein 10% and 65% by weight of the confectionery product is pulp or the extract of pulp extract, preferably between 20% and 60%.
9. The confectionery product of any of clauses 1 to 8, wherein the confectionery product comprises cocoa mass, preferably, wherein the confectionery product comprises between 45% and 80% or between 8% and 12% by weight of the confectionery product of cocoa mass and optionally, wherein the confectionery product consists essentially of cocoa mass and the extract of pulp or cocoa mass and dried pulp.
10. A process for producing a chocolate product where all ingredients are from a cocoa pod.

11. A composition that is obtainable by a process comprising:
a. treating pulp from a plant in the *Theobroma* genus, preferably cocoa pulp, or an extract of pulp from a plant in the *Theobroma* genus, preferably cocoa pulp, to reduce the polysaccharide content and/or treating pulp from a plant in the *Theobroma* genus, preferably cocoa pulp, or an extract of pulp from a plant in the *Theobroma* genus, preferably cocoa pulp, to adjust the pH,
b. drying the product of step a.

12. The composition of clause 11, wherein the treatment step a. comprises treatment with an enzyme to reduce the polysaccharide content.

13. The composition of clauses 11 or 12, wherein treatment step a. comprises the reduction of the pectin content and/or cellulose in the pulp or extract of pulp.

14. The composition of clause 13, wherein treatment step a. comprises treatment with a pectinase and/or a cellulase.

15. The composition of any of clauses 12 to 14, wherein treatment step a. comprises treatment with more than one enzyme.

16. The composition of any of clauses 12 to 15, wherein treatment step a. is with other enzymes than pectinases or a mixture of a pectinase with another enzyme, preferably the other enzymes have activity against other polysaccharides, preferably cellulose, hemicellulose, arabinans, and/or beta-1,4-xylan.

17. The composition of any of clauses 12 to 16, wherein the enzyme treatment is carried out between 20° C. and 75° C. for between 10 minutes and 20 hours.

18. The composition of any of clauses 1 to 17, wherein the cocoa pulp or cocoa pulp is treated to increase the pH to be greater than pH 3.0, preferably the treatment may occur before or after any treatment to reduce the polysaccharide content in step a.

19. The composition of any of clauses 1 to 18, wherein the drying step b. reduces the water content to less than 10.0% by weight of water in the composition obtained.

20. A process for producing a composition derived from pulp from a plant in the *Theobroma* genus, preferably cocoa pulp, or an extract of pulp from a plant in the *Theobroma* genus, preferably, cocoa pulp, that comprises the process steps as defined in any of clauses 11 to 19.

21. A foodstuff, preferably a confectionery product, comprising the composition of any of clauses 11 to 20, preferably wherein the confectionery product is a chocolate product, preferably chocolate and preferably wherein between 5% and 65% by weight of the foodstuff, preferably confectionery product, is a composition of any of clauses 11 to 20.

22. The foodstuff of clause 21, which is a confectionery product, wherein the confectionery product consists essentially of cocoa mass and the composition of any of clauses 11 to 19.

23. The process of clause 20 comprising the steps of:
i. treating pulp from a plant in the *Theobroma* genus, preferably cocoa pulp, to reduce the polysaccharide content comprising treatment with a pectinase and/or a cellulase,
ii. treating the product of step i. to adjust the pH to between 4.0 and 7.0, and
iii. drying the product of step ii. to a water content of less than 10%.

24. The use of the composition of any of clauses 11 to 19 as a sugar replacement composition for replacing sugar in a food product, preferably in a confectionery product.

The invention claimed is:

1. A composition comprising dried pulp obtainable by a process comprising:
a. treating a pulp from a plant in the *Theobroma* genus to reduce a polysaccharide content and increase an oligosaccharide content relative to a level in the pulp or an extract of the pulp to form a product,
b. drying the product of step a. to form the dried pulp,
wherein the dried pulp in the composition has not been fermented, the dried pulp comprises a sugar component in an amount between 20.0 wt. % and 85.0 wt. % based on a total weight of the dried pulp, and the sugar component comprises less than 90.0 wt. % by weight of glucose and fructose based on a total weight of the sugar component.

2. The composition of claim 1, wherein the treating in step a. comprises treating the pulp with an enzyme to reduce the polysaccharide content relative to the level in the pulp or the extract of the pulp.

3. The composition of claim 1, wherein the treating step a. comprises reducing a pectin content and/or cellulose content in the pulp or the extract of the pulp.

4. The composition of claim 3, wherein the treating in step a. comprises treating the pulp with a pectinase and/or cellulase.

5. The composition of claim 2, wherein the enzyme comprises a pectinase and an additional enzyme selected from the group consisting of cellulase, arabanase/arabinanase, beta-glucanase, hemicellulase, xylanase and mixtures thereof.

6. The composition of claim 2, wherein the enzyme comprises a cellulase or a combination of a cellulase and a pectinase.

7. The composition of claim 2, wherein the treating of the pulp with the enzyme is carried out between 20° C. and 75° C. for between 10 minutes and 20 hours.

8. The composition of claim 1, wherein the pulp is a cocoa pulp, and the treating in step a. comprises treating the cocoa pulp to increase the pH to be greater than 3.0.

9. The composition of claim 1, wherein the drying in step b. comprises reducing a water content in the product to less than 10.0% by weight of water in the composition.

10. A process for producing a composition comprising dried pulp, the process comprising:
a. treating a pulp from a plant in the *Theobroma* genus to reduce a polysaccharide content and increase an oligosaccharide content relative to a level in the pulp or an extract of the pulp,
b. drying the product of step a. to form the dried pulp,
wherein the dried pulp in the composition has not been fermented, and the dried pulp comprises a sugar component in an amount between 20.0 wt. % and 85.0 wt. % based on a total weight of the dried pulp, and wherein the sugar component comprises less than 90.0 wt. % by weight of glucose and fructose based on a total weight of the sugar component.

11. A process for producing a composition comprising dried pulp, the process comprising:
i. treating a pulp from a plant in the *Theobroma* genus to reduce a polysaccharide content and increase an oligosaccharide content relative to a level in the pulp or an extract of the pulp, the treating comprising treating the pulp with a pectinase and/or a cellulase to form a first product;

ii. treating the first product of step i. to adjust the pH to between 4.0 and 7.0 to form a second product; and iii. drying the second product of step ii. to a water content of less than 10% by weight to form a dried pulp, wherein the dried pulp has not been fermented, and the dried pulp comprises a sugar component in an amount between 20.0 wt. % and 85.0 wt. % based on a total weight of the dried pulp, and wherein the sugar component comprises less than 90.0 wt. % by weight of glucose and fructose based on a total weight of the sugar component.

12. The composition of claim 1, wherein the pulp is treated in at least one of step a. or step b. in the absence of any *Theobroma* beans.

13. The process of claim 10, wherein the pulp is treated in at least one of step a. or step b. in the absence of any *Theobroma* beans.

14. The process of claim 11, wherein the pulp is treated in at least one of step i., step ii., or step iii. in the absence of any *Theobroma* beans.

15. The composition of claim 7, wherein the treating of the pulp with the enzyme is carried out between 20° C. and 75° C. for between 15 minutes and 4 hours.

16. The process of claim 11, wherein the treating of the pulp in step i. with the combination of the pectinase and the cellulase reduces a viscosity of the pulp by 80% to 98%, as measured in centipoises and relative to a starting viscosity of the pulp.

17. The composition of claim 2, wherein the enzyme is present in a total amount between 0.5 wt. % and 5.0 wt. % based on the total weight of the pulp.

18. The composition of claim 1, wherein the pulp comprises dietary fibre in an amount between 5.0 wt. % and 30.0 wt. % by weight of the pulp.

19. The process of claim 11, further comprising conching the composition comprising the dried pulp at a temperature between 30° C. and 60° C. for a time period between 1.5 and 8 hours.

20. The process of claim 11, wherein the pulp is in a powder form, and the powder has a particle size d50 in a range of 20-800 microns.

21. The composition of claim 1, wherein the sugar component comprises less than 75.0 wt. % by weight of glucose and fructose based on a total weight of the sugar component.

* * * * *